United States Patent
Yang et al.

(10) Patent No.: US 10,055,775 B2
(45) Date of Patent: Aug. 21, 2018

(54) INFORMATION PROVIDING METHOD, MOBILE TERMINAL AND DISPLAY DEVICE FOR THE SAME

(71) Applicant: SAMSUNG ELECTRONICS CO., LTD., Suwon-si (KR)

(72) Inventors: Do-jun Yang, Yongin-si (KR); Sun-eung Park, Suwon-si (KR); Jin-goo Seo, Seoul (KR); Soo-in Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/975,846

(22) Filed: Aug. 26, 2013

(65) Prior Publication Data

US 2014/0058897 A1 Feb. 27, 2014

(30) Foreign Application Priority Data

Aug. 24, 2012 (KR) .................. 10-2012-0093250

(51) Int. Cl.
| | |
|---|---|
| G06Q 30/00 | (2012.01) |
| G06Q 30/06 | (2012.01) |
| G06Q 20/32 | (2012.01) |
| G06Q 20/20 | (2012.01) |
| G06Q 20/38 | (2012.01) |

(52) U.S. Cl.
CPC ......... *G06Q 30/0623* (2013.01); *G06Q 20/20* (2013.01); *G06Q 20/3278* (2013.01); *G06Q 20/387* (2013.01); *G06Q 30/0601* (2013.01)

(58) Field of Classification Search
CPC .......... G06Q 30/0601–30/0645; G06Q 30/08; G06Q 30/0623; G06Q 20/20; G06Q 20/3278; G06Q 20/387
USPC ..................... 705/26.1–27.2, 26.61
See application file for complete search history.

(56) References Cited

U.S. PATENT DOCUMENTS

| | | | |
|---|---|---|---|
| 8,406,809 B2 | 5/2013 | Florek et al. | |
| 2009/0192912 A1* | 7/2009 | Griffin | G06Q 20/10 705/26.1 |
| 2010/0082445 A1 | 4/2010 | Hodge et al. | |
| 2010/0218211 A1* | 8/2010 | Herigstad | H04N 7/163 725/34 |

(Continued)

FOREIGN PATENT DOCUMENTS

| | | |
|---|---|---|
| CN | 101286253 A | 10/2008 |
| CN | 101438581 A | 5/2009 |

(Continued)

OTHER PUBLICATIONS

Balaban, Dan "The Future of Contactless SIM" Card Technology, Jan. 2005, p. 16 (Year: 2005).*

(Continued)

*Primary Examiner* — Matthew E Zimmerman
*Assistant Examiner* — Katherine L O'Sullivan
(74) *Attorney, Agent, or Firm* — Sughrue Mion, PLLC

(57) ABSTRACT

A method of acquiring and processing information on a mobile terminal is provided. The method includes: receiving, at the mobile terminal, information about at least one item displayed on an external display device from the external display device; and performing, at the mobile terminal, a function for the at least one item based on the received information.

18 Claims, 17 Drawing Sheets

(56) References Cited

U.S. PATENT DOCUMENTS

| | | | |
|---|---|---|---|
| 2010/0250664 A1 | 9/2010 | Naka | |
| 2010/0262537 A1 | 10/2010 | Park | |
| 2010/0306837 A1 | 12/2010 | Ueno et al. | |
| 2011/0173073 A1 | 7/2011 | Wang et al. | |
| 2011/0307318 A1 | 12/2011 | LaPorte et al. | |
| 2011/0320293 A1 | 12/2011 | Khan | |
| 2012/0042087 A1* | 2/2012 | Berg et al. | 709/229 |
| 2012/0077593 A1* | 3/2012 | Sarmenta | A63F 3/00643 463/40 |
| 2012/0208466 A1* | 8/2012 | Park et al. | 455/41.3 |
| 2012/0259771 A1 | 10/2012 | Hwang et al. | |
| 2012/0278192 A1* | 11/2012 | Shirron | G06Q 20/123 705/26.1 |
| 2013/0072116 A1* | 3/2013 | Song et al. | 455/41.1 |
| 2013/0203346 A1* | 8/2013 | Han | H04M 1/7253 455/41.1 |

FOREIGN PATENT DOCUMENTS

| | | |
|---|---|---|
| CN | 101842794 A | 9/2010 |
| EP | 1853061 A1 | 11/2007 |
| KR | 10-2006-0073099 A | 6/2006 |
| KR | 10-2011-0094176 A | 8/2011 |
| KR | 10-2012-0033751 A | 4/2012 |
| KR | 101179121 B1 | 9/2012 |
| KR | 10-2012-0115764 A | 10/2012 |
| RU | 2445704 C2 | 3/2012 |
| WO | 2006/110672 A2 | 10/2006 |
| WO | 2012/014185 A1 | 2/2012 |
| WO | 2012014185 A4 | 2/2012 |
| WO | 2012148590 A1 | 11/2012 |

OTHER PUBLICATIONS

International Search Report, dated Dec. 16, 2013, issued by the International Searching Authority in counterpart International Application No. PCT/KR2013/007572.
Written Opinion, dated Dec. 16, 2013, issued by the International Searching Authority in counterpart International Application No. PCT/KR2013/007572.
Communication, dated Dec. 17, 2013, issued by the European Patent Office in counterpart European Application No. 13181611.8.
Communication dated Sep. 4, 2015, issued by the Australian Patent Office in counterpart Australian Application No. 2013306546.
Communication dated May 18, 2016, issued by the Federal Service on Industrial Property in counterpart Russian Patent Application No. 2015110323.
Communication dated Mar. 2, 2016, issued by Australian Government IP Australia in counterpart Australian Application No. 2013306546.
Communication dated Oct. 21, 2016, issued by the European Patent Office in counterpart European Application No. 13181611.8.
Communication dated Dec. 29, 2016, issued by the State Intellectual Property Office of P.R. China in counterpart Chinese Application No. 201380044485.8.
Communication dated Aug. 24, 2017, issued by the State Intellectual Property Office of P.R. China in counterpart Chinese application No. 201380044485.8.
Communication dated Jan. 16, 2017 issued by the Russia Federal Service on Intellectual Property in counterpart Russian Patent Application No. 2015110323.
Communication dated Mar. 5, 2018, issued by the State Intellectual Property Office of P.R. China in counterpart Chinese application No. 201380044485.8.

* cited by examiner

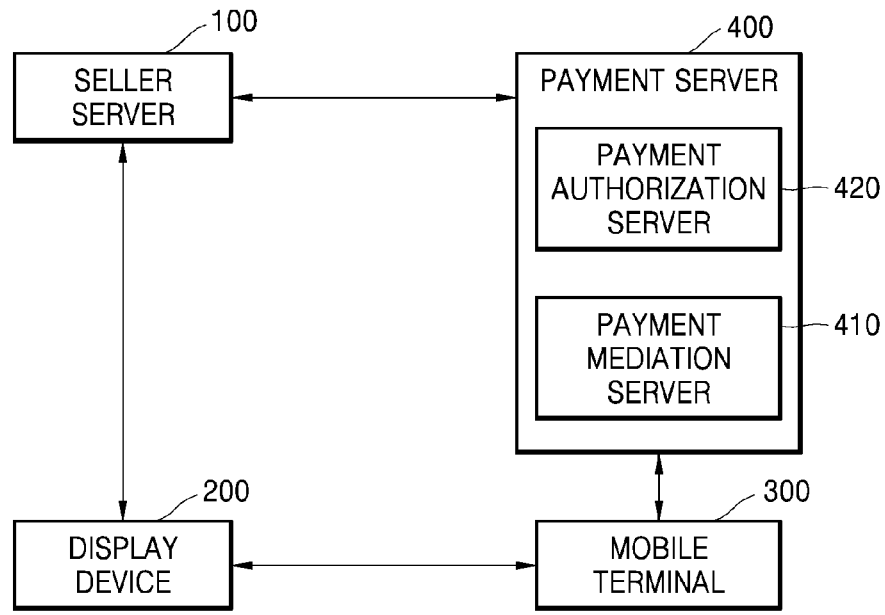
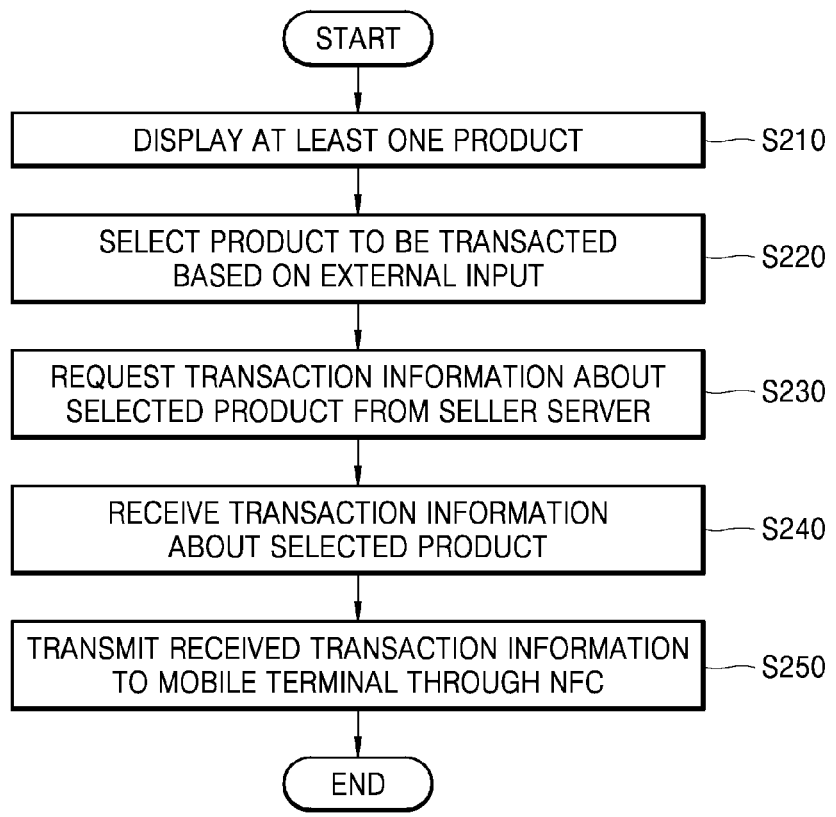

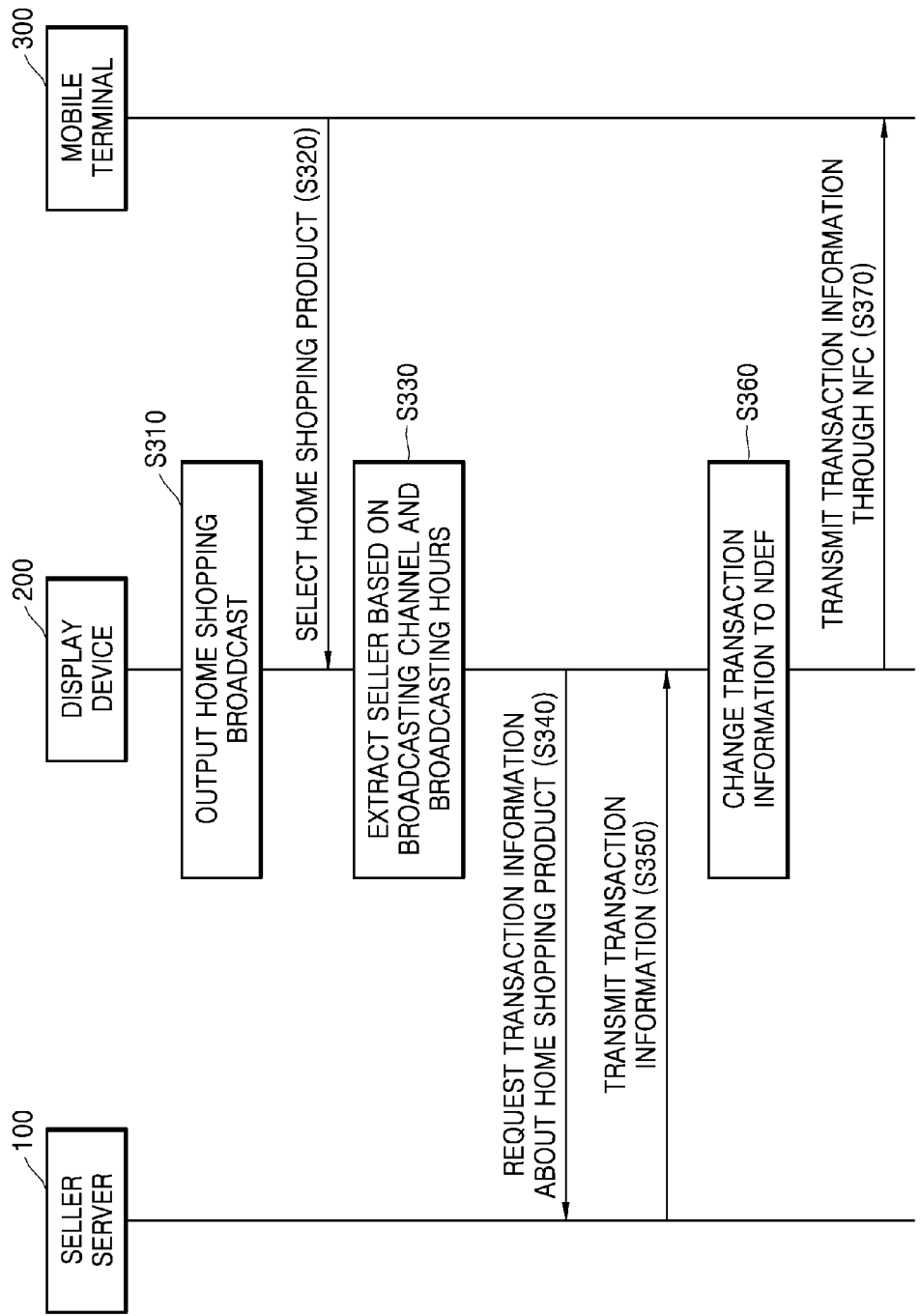

```
< <MBPP NDEF Example> >
<SamsungNFCmsg>
<deviceInfo>
  <sndrType>SmartTV</sndrType>
  <sndrName>Park's SmartTV</sndrName>
</deviceInfo>
<MBPPRequest>
  <sellerid> 1234</sellerid>
  <appid>app-7890</appid>
  <products>
  <product name="product_2" price="XXX" price_unit="$"/>
  </products>
</MBPPRequest>
</SamsungNFCmsg>
```

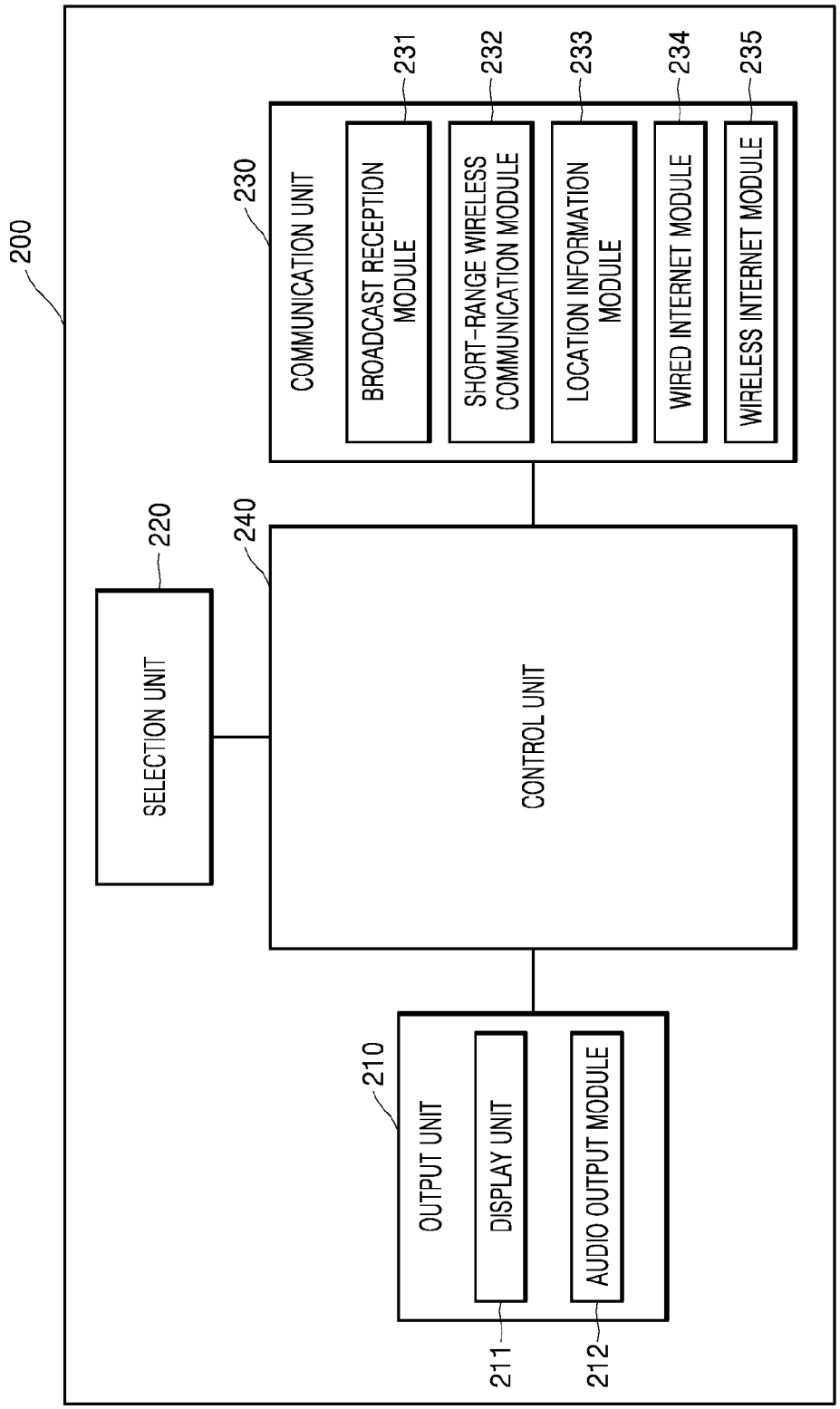

INFORMATION PROVIDING METHOD, MOBILE TERMINAL AND DISPLAY DEVICE FOR THE SAME

CROSS-REFERENCE TO RELATED PATENT APPLICATION

This application claims priority from Korean Patent Application No. 10-2012-0093250, filed on Aug. 24, 2012, in the Korean Intellectual Property Office, the disclosure of which is incorporated herein in its entirety by reference.

BACKGROUND

1. Field

Exemplary embodiments relate to a method of acquiring information and payment processing mobile terminal, an information providing method of a display device, and a payment system, which provide secure and convenient information to an individual using the mobile terminal and display device.

2. Description of the Related Art

Due to the accessibility of a television (TV) and the number of TV's in use, the TV is an important channel for publicizing products, objects, events, or persons and inducing viewers to purchase or learn more about the products, objects, persons or events. Thus, viewers often want to buy or acquire information about a product, event, object or person being advertised or displayed on the TV while watching TV. However, the process of purchasing or acquiring information about the object, event, or person displayed on the TV is inconvenient. For example, a viewer may have to turn on a computer, search for the product on a website, and input credit card information through the computer to pay for the product or input search information to acquire information about an object displayed on the TV. Even when using TV home shopping networks, a viewer will have to place a phone call to a home shopping business operator.

In addition, if the TV itself has methods of payment or searching for information, a viewer may give up buying the product or acquiring information through the TV due to the inconvenience of input methods of the TV. Thus, a system enabling easy and safe payment or acquisition of information is required in a display device, such as the TV.

SUMMARY

Exemplary embodiments provide a method, apparatus and system for providing information to a mobile terminal from an external display.

According to an aspect of an exemplary embodiment, a method of acquiring and processing information on a mobile terminal is provided. The method includes: receiving, at the mobile terminal, information about at least one item displayed on an external display device from the external display device; and performing, at the mobile terminal, a function for the at least one item based on the received information.

The receiving may be performed by using wireless communication. The wireless communication may include near field communication (NFC).

The method may also include displaying, at the mobile terminal, at least one menu item corresponding to the item displayed on the external display device based on the received information and selecting, at the mobile terminal, the displayed menu item. The function may be performed based on the selecting the menu item.

The performing the function may include transmitting a request for additional information based on the received information and information about a selection of a user and receiving additional information corresponding to the request for additional information.

The receiving the information may include receiving the information encoded in an NFC data exchange format (NDEF) and decoding the information encoded in the NDEF.

The information encoded in the NDEF may include a first field comprising information about the external display device and a second field comprising the information about the at least one item displayed on the external display device.

Tithe receiving the information may include receiving at least one of location information and ID information of the external display device.

The external display device may be at least one of a smart television (TV), a kiosk, a vending machine, and an advertisement device.

According to an aspect of an exemplary embodiment, an information providing method for providing information from a display device to a mobile terminal is provided. The information providing method includes: displaying a screen comprising at least one item; receiving first information about the at least one item from a server; and transmitting second information corresponding the first information to the mobile terminal through wireless communication. The wireless communication comprises near field communication (NFC).

The transmitting may include encoding the first information to generate second information encoded in an NFC data exchange format (NDEF); and transmitting the second information encoded in the NDEF to the mobile terminal.

The transmitting the second information encoded in the NDEF may include storing the second information encoded in the NDEF in an NFC tag.

The method may also include deleting the second information transmitted to the mobile terminal from the NFC tag.

The second information may include a first field including information about the display device and a second field including the information about the at least one item displayed on the display device.

The at least one item may be an on-air item displayed on the display device as part of a broadcast.

The display device may be at least one of a smart television (TV), a kiosk, a vending machine, and an advertisement device.

According to an aspect of an exemplary embodiment, a mobile terminal includes: a communication unit which is configured to receive information about at least one item displayed on an external display device from the external display device; and a controller which is configured to perform a function corresponding to the at least one item based on the received information.

The communication unit may be configured to receive the information using near field communication (NFC).

The mobile terminal of claim 20 may also include a display which is configured to display a menu item corresponding to the received information and a user input which is configured to receive a user selection of the displayed menu item. The controller may be further configured to performing the function based on the user selection.

The received information may be encoded in NFC data exchange format (NDEF), and the controller may decode the received information encoded in the NDEF.

The information encoded in the NDEF may include a first field comprising information about the external display device and a second field comprising the information about the at least one item displayed on the external display device.

According to an aspect of an exemplary embodiment, a display device includes: a display; a communication unit which is configured to transmit and receive information; and a controller which is configured to control the display to display at least one item, control the communication unit receive first information about the at least one item from a server, process the first information to generate second information, and control the communication unit to transmit the second information to a mobile terminal through wireless communication.

The second information may be encoded in an NFC data exchange format (NDEF).

The second information may also include a first field comprising information about the display device and a second field comprising the information about the at least one item displayed on the external display device.

The controller may store the second information encoded in the NDEF in an NFC tag.

The at least one item may be an on-air item displayed as part of a broadcast.

According to an aspect of an exemplary embodiment, a system is provided. The system includes: a mobile terminal; and a display device which is configured to display at least one item, receive first information about the at least one item from a server, process the first information to generate second information, and transmit the second information to the mobile terminal through wireless communication. The mobile terminal is configured to receive the second information about the at least one item displayed on the display device and perform a function corresponding the at least one item based on the received second information.

Exemplary embodiments also provide a payment processing method and a mobile terminal for the same, a transaction information providing method and a display device for the same, and a payment system, which prevent payment information of a user from being leaked by transmitting transaction information about a product displayed on a display device to a mobile terminal of the user through a near field communication (NFC) and transmitting a payment authorization request about the product from the mobile terminal to a payment server.

According to an aspect of an exemplary embodiment there is provided a payment processing method of a mobile terminal, the payment processing method including: receiving transaction information about at least one product displayed on a display device from the display device through a near field communication (NFC); receiving a selection on a payment method related to a user of the mobile terminal; and performing a payment process on the at least one product based on at least a part of the received transaction information and information about the selected payment method.

The performing of the payment process may include transmitting a payment request including the at least a part of the received transaction information and the information about the selected payment method to a payment server.

The payment processing method may further include receiving a payment authorization result on the payment request from the payment server.

The receiving of the transaction information may include: receiving transaction information encoded in an NFC data exchange format (NDEF); and decoding the transaction information encoded in the NDEF.

The payment processing method may further include requesting the transaction information about the at least one product displayed on the display device from the display device through the NFC.

The transaction information may include at least one of product information, seller information, a transaction identification (ID), point providing information, discount payment method information, and delivery date information.

The receiving of the transaction information may further include receiving at least one of location information and ID information of the display device.

The payment processing method may further include displaying the received transaction information and the information about the selected payment method on a screen.

The payment method may include at least one of a credit card, a debit card, a credit transfer, securities, a coupon, and an account-based payment method.

The receiving of the selection on the payment method may include: obtaining discount rate information about a plurality of payment methods related to the user of the mobile terminal, based on the received transaction information; recommending a payment method on the at least one product, based on the obtained discount rate information; and receiving a selection on the recommended payment method from the user.

The receiving of the selection on the payment method may include: recommending a payment method on the at least one product, based on use pattern information of the user with respect to a plurality of payment methods related to the user of the mobile terminal; and receiving a selection of the user on the recommended payment method.

The receiving of the selection on the payment method may include: receiving authentication information about the payment method from the user; and authenticating access authority of the user about the payment method based on the authentication information.

The authentication information may include at least one of individual ID information about a certificate, individual ID information corresponding to the payment method, pattern input information corresponding to the payment method, and fingerprint information of the user.

The transmitting of the payment request may include: generating a payment statement including the at least a part of the received transaction information and the information about the selected payment method; encoding the generated payment statement; and transmitting the encoded payment statement to the payment server.

The payment processing method may further include: receiving a plurality of pieces of transaction information respectively corresponding to a plurality of products from the display device through the NFC; and displaying a list of the plurality of pieces of transaction information respectively corresponding to the plurality of products.

According to an aspect of another exemplary embodiment, there is provided a transaction information providing method for providing transaction information from a display device to a mobile terminal, the transaction information providing method including: displaying at least one product; selecting a product to be transacted from among the displayed at least one product, based on an external input; requesting transaction information about the selected product from a seller server; receiving the transaction information about the selected product from the seller server; and transmitting the received transaction information to the mobile terminal through a near filed communication (NFC).

The transmitting may include: encoding the received transaction information in an NFC data exchange format (NDEF); and transmitting the transaction information encoded in the NDEF to the mobile terminal.

The transmitting of the transaction information encoded in the NDEF may include storing the transaction information encoded in the NDEF in an NFC tag.

The transaction information providing method may further include deleting the transaction information transmitted to the mobile terminal from the NFC tag.

The displaying of the at least one product may include: receiving a product list and seller identification (ID) information from the seller server; and displaying the received product list and the seller ID information on a screen.

The receiving of the product list and the seller ID information may include: displaying a list of a plurality of shopping applications respectively interlocked with a plurality of seller servers; receiving a selection on at least one shopping application from the list; and executing the selected shopping application and requesting a product list from a seller server corresponding to the selected shopping application.

The selecting of the product to be transacted may include selecting an on-air product on the display device at a point in time when the external input is received, and the requesting of the transaction information about the selected product may include requesting transaction information about the on-air product from the seller server based on broadcasting channel information and broadcasting hour information.

The transaction information providing method may further include: receiving a payment authorization result on the selected product; and displaying the payment authorization result.

The selecting of the product to be transacted may include receiving the external input on the selection of the product to be transacted through one of an infrared-ray communication, an NFC, a Bluetooth, Wi-Fi direct (WFD), an ultra wideband (UWB), and a wireless local area network (LAN).

The transaction information providing method may further include: receiving transaction information respectively corresponding to a plurality of products from the seller server; and displaying a list of the received transaction information respectively corresponding to the plurality of products.

According to an aspect of another exemplary embodiment, there is provided a mobile terminal including: a communication unit for receiving transaction information about at least one product displayed on a display device from the display device through a near field communication (NFC); a user input unit for receiving a selection on a payment method related to a user of the mobile terminal; and a control unit for performing a payment process on the at least one product based on at least a part of the received transaction information and information about the selected payment method.

The control unit may transmit a payment request including the at least a part of the received transaction information and the information about the selected payment method to a payment server.

The communication unit may receive a payment authorization result on the payment request from the payment server.

The communication unit may receive transaction information encoded in an NFC data exchange format (NDEF), and the control unit may decode the transaction information encoded in the NDEF.

The communication unit may request the transaction information about the at least one product displayed on the display device from the display device through the NFC.

The communication unit may further receive at least one of location information and identification (ID) information of the display device.

The mobile terminal may further include a display unit for displaying the received transaction information and the information about the selected payment method on a screen.

The control unit may obtain discount rate information about a plurality of payment methods related to the user of the mobile terminal, based on the received transaction information and recommends a payment method on the at least one product, based on the obtained discount rate information, and the user input unit may receive a selection on the recommended payment method from the user.

The control unit may recommend a payment method on the at least one product, based on use pattern information of the user with respect to a plurality of payment methods related to the user of the mobile terminal; and the user input unit may receive a selection of the user on the recommended payment method.

The user input unit may receive authentication information about the payment method from the user, and the control unit may authenticate access authority of the user about the payment method based on the authentication information.

The control unit may generate a payment statement including the at least a part of the received transaction information and the information about the selected payment method, encode the generated payment statement, and transmit the encoded payment statement to the payment server.

The communication unit may receive a plurality of pieces of transaction information respectively corresponding to a plurality of products from the display device through the NFC, and the display unit may display a list of the plurality of pieces of transaction information respectively corresponding to the plurality of products.

According to an aspect of another exemplary embodiment, there is provided a display device including: a display unit for displaying at least one product; a selection unit for selecting a product to be transacted from among the displayed at least one product, based on an external input; a communication unit for requesting transaction information about the selected product from a seller server, receiving the transaction information about the selected product from the seller server, and transmitting the received transaction information to the mobile terminal through a near filed communication (NFC); and a control unit for controlling the display unit, the selection unit, and the communication unit.

The control unit may encode the received transaction information in an NFC data exchange format (NDEF), and the communication unit may transmit the transaction information encoded in NDEF to the mobile terminal.

The control unit may store the transaction information encoded in NDEF in an NFC tag.

The control unit may delete the transaction information transmitted to the mobile terminal from the NFC tag.

The communication unit may receive a product list and seller identification (ID) information from the seller server, and the display unit may display the received product list and the seller ID information on a screen.

The display unit may display a list of a plurality of shopping applications respectively interlocked with a plurality of seller servers, and the control unit may receive a selection on at least one shopping application from the list, execute the selected shopping application, and request a product list from a seller server corresponding to the selected shopping application.

The selection unit may select an on-air product on the display device at a point in time when the external input is received, and the communication unit may request transaction information about the on-air product from the seller server based on broadcasting channel information and broadcasting hour information.

The communication unit may receive a payment authorization result on the selected product, and the display unit may display the payment authorization result on a screen.

The communication unit may receive the external input on the selection of the product to be transacted through one of an infrared-ray communication, an NFC, a Bluetooth, Wi-Fi direct (WFD), an ultra wideband (UWB), and a wireless local area network (LAN).

The communication unit may receive transaction information respectively corresponding to a plurality of products from the seller server, and the display unit may display a list of the received transaction information respectively corresponding to the plurality of products.

The display device may include at least one of a smart television (TV), a kiosk, a vending machine, and an advertisement device.

According to an aspect of another exemplary embodiment, there is provided a payment system including: a display device for selecting a product to be transacted from among at least one product displayed on a screen based on an external input, receiving transaction information about the selected product from a seller server, encoding the received transaction information in a near field communication (NFC) data exchange format (NDEF), and storing the encoded transaction information in an NFC tag; and a mobile terminal for receiving the transaction information from the display device through an NFC, receiving a selection on a payment method related to a user of the mobile terminal, and performing a payment process on the selected product based on at least a part of the received transaction information and information about the selected payment method.

The payment system may further include a payment mediation server for distributing a shopping application of a seller to the display device, managing information about the seller, and requesting payment authorization from a payment authorization server by receiving a payment statement from the mobile terminal.

The payment system may further include a seller server for providing a product list and seller identification (ID) information to the display device, receiving a request for the transaction information about the product selected by the user from the display device, and transmitting the transaction information to the display device.

BRIEF DESCRIPTION OF THE DRAWINGS

The above and other features and advantages of the exemplary embodiments will become more apparent by describing in detail exemplary embodiments thereof with reference to the attached drawings in which:

FIG. 1 is a block diagram of a payment system according to an exemplary embodiment;

FIG. 2 is a flowchart illustrating a transaction information providing method of a display device, according to an exemplary embodiment;

FIG. 3 is a flowchart illustrating a transaction information providing method about a home shopping product of a display device, according to an exemplary embodiment;

FIG. 19 is a block diagram of a display device according to an exemplary embodiment.

DETAILED DESCRIPTION OF THE EXEMPLARY EMBODIMENTS

Figure 4:
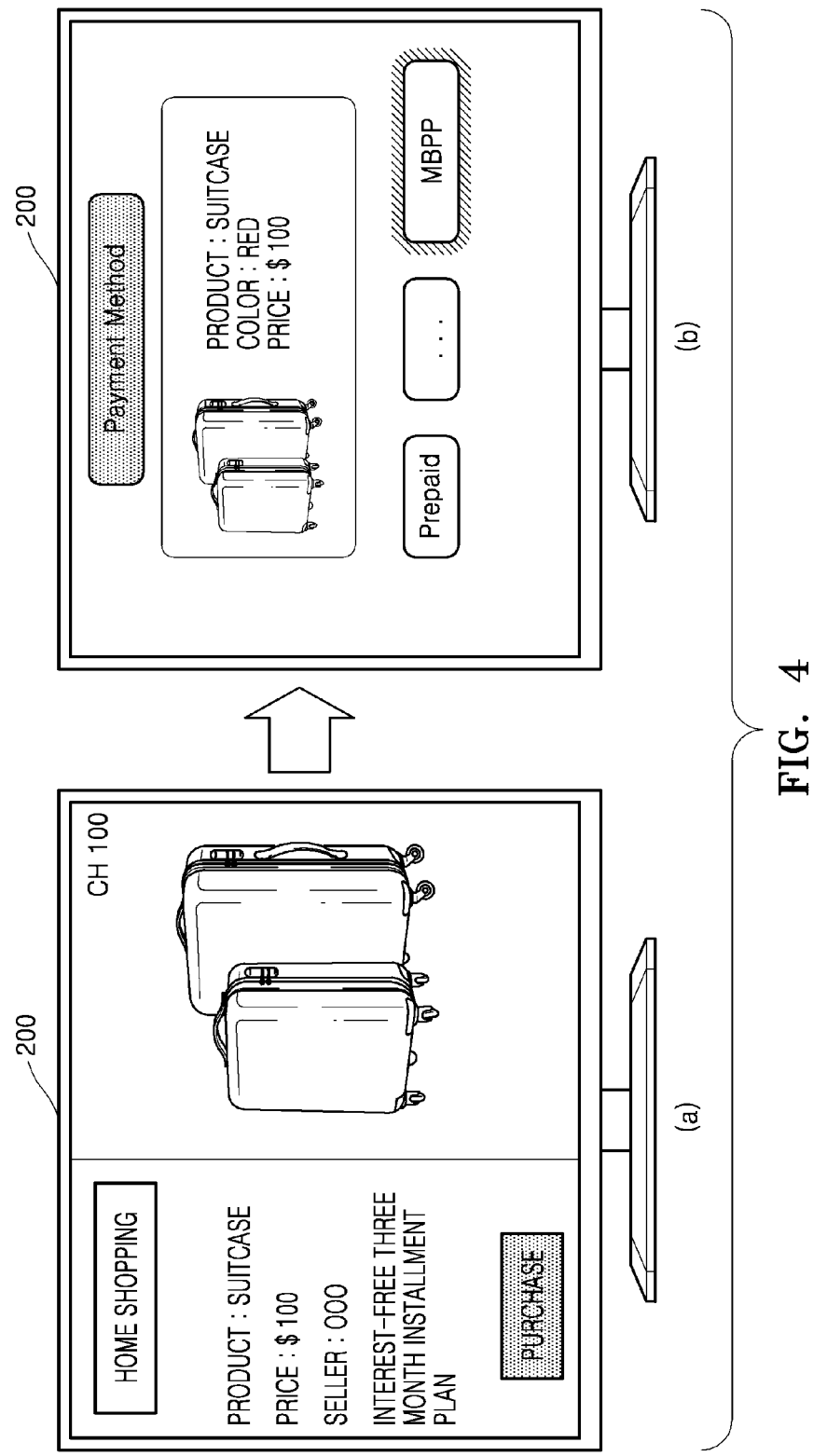
FIG. 4 illustrates screens for requesting transaction information about a home shopping product during a home shopping broadcast, according to an exemplary embodiment.

Hereinafter, terms used herein will be briefly described, and one or more exemplary embodiments will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Some terms may be arbitrarily selected by the applicant, and in this case, the meaning of the selected terms will be described in detail in the detailed description of the exemplary embodiments.

Thus, the terms used herein have to be defined based on the meaning of the terms together with the description throughout the specification.

When a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

Herein, "transaction information" may denote information for a user to transact (for example, trade, rent, and exchange) a product with a seller or may also denote information used to acquire information about an object, event, program displayed on the TV. For example, transaction information according to an exemplary embodiment may include information about a purchased product (a product code, a manufacture date, an expiration date, a product price, a manufacturer, a color, a size, and a product quantity), information about a seller (a seller name, a seller identification (ID) code, contact information of a seller, and an application ID of a seller), and information about a number of months for an installment plan. In another exemplary embodiment, transaction information may include any information corresponding to an object, person, event, product, program displayed on the television that may be used to acquire additional information corresponding to the object, person, event, product, program displayed on the television. The information may include information such as a link, identification code, name, etc. about an information provider, database, or content provider that provides additional information.

Herein, a product not only denotes a tangible product (for example, a bag, a fish, or a book), but also denotes an intangible product (for example, a travel service, a massage service, or a beauty service).

Exemplary embodiments will be described more fully with reference to the accompanying drawings. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the exemplary embodiments to those skilled in the art. In the drawings, elements not related to the exemplary embodiments are not illustrated for clear description, and like reference numerals denote like elements.

FIG. 1 is a block diagram of a payment system according to an exemplary embodiment.

The payment system may include a seller server 100, a display device 200, a mobile terminal 300, and a payment server 400. However, the components shown in FIG. 1 are not essential. In other words, the payment system may be realized by more or less components than those shown in FIG. 1.

The components of the payment system will now be described in detail.

The seller server 100 is a server built by a seller who sells products through the display device 200, and may provide an on-line shopping or home shopping service to the display device 200. The seller server 100 may store information about the products sold by the seller, information about the seller (for example, a business name, a logo, an application ID of the seller), etc.

The seller server 100 may communicate with the display device 200 through a seller application distributed to the display device 200. For example, the seller server 100 may provide an available product list to the display device 200. The seller server 100 may provide transaction information about a certain product selected by a user to the display device 200.

The display device 200 is any one of various types of devices including a display panel. Examples of the display device 200 according to an exemplary embodiment include a smart television (TV), an internet protocol TV (IPTV), a digital TV (DTV), a computer, a laptop, an electronic book terminal, a tablet personal computer (PC), a mobile phone, a digital broadcasting terminal, a personal digital assistant (PDA), a portable multimedia player (PMP), a navigation device, a consumer electronics (EC) device (for example, a refrigerator or air conditioner having a display panel), a kiosk, a vending machine, and an advertisement device, but are not limited thereto.

The display device 200 may display at least one product on a screen. For example, the display device 200 may display at least one product through a home shopping broadcasting channel. Alternatively, the display device 200 may display at least one product through the seller application.

The display device 200 may download or execute at least one seller application distributed by the seller, based on a user input. The display device 200 may receive a product list to be sold by the seller through the seller application. When the user selects at least one product displayed on the display device 200, the display device 200 may request transaction information from the seller server 100 through the seller application.

The display device 200 may include a near field communication (NFC) tag for performing NFC communications. The display device 200 according to an exemplary embodiment may store data to be transmitted to the mobile terminal 300 in the NFC tag.

The display device 200 may include a user input unit for receiving a user input. The user input unit may be mounted in the display device 200 or may exist outside the display device 200 in a form of a remote controller. The remote controller may be realized in any one of various shapes. Examples of the remote controller include a remote controller exclusive to the display device 200, and the mobile terminal 300, such as a smart phone, a mobile phone, or a tablet PC.

The mobile terminal 300 according to an exemplary embodiment is a device for processing a payment on a product. The mobile terminal 300 may be realized in any one of various forms. Examples of the mobile terminal 300 include a mobile phone, a smart phone, a laptop, a tablet PC, an electronic book terminal, a PDA, a PMP, a navigation device, an MP3 player, and a camera.

The mobile terminal 300 may communicate with the display device 200 and the payment server 400 through a network. The network according to an exemplary embodiment may be realized using a wireless communication technology, such as wireless fidelity (Wi-Fi), home radio frequency (RF), Bluetooth, HR WPAN, UWB, LR WPAN, or IEEE 1394.

The mobile terminal 300 may include a security region. Examples of the security region include a subscriber identity module (SIM) and a universal SIM (USIM).

A USIM is a combination of an SIM card including subscriber information and a universal integrated chip (IC) card (UICC), wherein various functions, such as user authentication, global roaming, and electronic commerce, are realized in one card. The USIM includes a small central processing unit (CPU) and a memory, wherein the CPU identifies a user via an encoding and decoding function, and the memory is used as a storage space for supplementary services. In other words, the security region may operate as a hardware security module (HSM).

The mobile terminal 300 according to an exemplary embodiment may store a mobile card in the security region. The mobile card is a card realized in software in the mobile terminal 300. The mobile card may be published to the mobile terminal 300 through a wireless network.

The mobile terminal 300 may also store payment information of the user, as well as the mobile card. For example, the mobile terminal 300 may store information for a credit transfer (for example, a bank account, a bank account number, and an account holder) and account information used for payment (for example, a payment ID and a payment e-mail address). According to an exemplary embodiment, the information for the credit transfer and the account information used for the payment may be stored in an external server for managing personal information of the user.

The mobile terminal 300 may request a payment from the payment server 400. In other words, the mobile terminal 300 according to an exemplary embodiment may generate a payment statement for a payment request. In addition, the mobile terminal 300 may receive a payment authorization result from the payment server 400.

The payment server 400 receives a payment request about a predetermined transaction from the mobile terminal 300, and processes payment authorization about the predetermined transaction. According to an exemplary embodiment, the payment server 400 may be a single server or a plurality of servers. For example, the payment server 400 may include a payment mediation server 410 and a payment authorizations server 420.

The payment mediation server 410 mediates a payment between the mobile terminal 300 and the payment authorization server 400, and pays for sales money for the seller. In other words, the payment mediation server 410 may collect money from a credit card company or bank of a buyer instead of the seller, and then pay the seller with an amount of money from which a fee is deducted.

The payment mediation server 410 according to an exemplary embodiment may receive seller information (an ID, a personal ID number, and a bank account of the seller) from the seller, and issue and manage an account of the seller based on the seller information.

The payment mediation server 410 according to an exemplary embodiment may register and mange a shopping application generated by the seller. While registering the shopping application, the payment mediation server 410 may provide an application ID, and manage the application ID in association with an ID of the seller. In other words, the payment mediation server 410 may package the application ID, a description about the shopping application, an application icon, the ID of the seller, bank account information of the seller, and the shopping application.

The payment mediation server 410 may distribute the shopping application to the display device 200. For example, the payment mediation server 410 may receive a shopping application provide request including the application ID from the display device 200, and transmit the shopping application to the display device 200 by searching for the shopping application based on the application ID.

The payment authorization server 420 authorizes the payment request about the predetermined product received from the mobile terminal 300 or the payment mediation server 410.

The payment authorization server 420 may transmit a payment authorization result to the mobile terminal 300. Alternatively, the payment authorization server 420 may transmit the payment authorization result to the payment mediation server 410, the seller server 100, and the display device 200.

The payment authorization server 420 according to an exemplary embodiment may be a credit card company server or a financial company server.

A method of providing transaction information from the display device 200 to the mobile terminal 300 will now be described in detail with reference to FIG. 2.

FIG. 2 is a flowchart illustrating a transaction information providing method of the display device 200, according to an exemplary embodiment.

In operation S210, the display device 200 may display at least one product on a screen. In other words, the display device 200 may display information about products to be sold to the user on the screen. For example, the display device 200 may display an image of products, a price of products, a quantity of products, and seller ID information on the screen. In another example, the display device 200 may display information about an object, person, event, product and program.

According to an exemplary embodiment, the display device 200 may display at least one product through a home shopping broadcasting channel or another broadcast channel.

Alternatively, the display device 200 may display at least one product through a shopping application or another application. In other words, the display device 200 may receive the product list and the seller ID information from the seller server 100 through the shopping application, and display the received product list and seller ID information on the screen.

In operation S220, the display device 200 may select a product to be transacted or for which additional information is requested from the at least one product displayed on the screen, based on an external input. Here, the external input may denote a user input for selecting the product to be transacted. In other words, the user may select a product to be purchased from the at least one product displayed on the display device 200 by using the remote controller or the mobile terminal 300 for controlling the display device 200.

According to an exemplary embodiment, the display device 200 may receive the external input through any one of various communication technologies. For example, the display device 200 may receive the external input through one of an infrared-ray communication, an NFC, a Bluetooth, a Wi-Fi direct (WFD), an ultra wideband (UWB), and wireless local area network (WLAN).

In operation S230, the display device 200 may request the transaction information about the selected product from the seller server 100 or may request information about the object, person, event, product, program displayed on the television. The display device 200 may request the transaction information or additional information from the seller server 100 through a wired or wireless communication. The transaction information according to an exemplary embodiment may include product information (for example, a product code, a product price, a manufacturer, a color, a size, and a product quantity), seller information (for example, a seller name, a seller ID code, contact information of the seller, and an application ID of the seller), a number of months for an installment plan, discount information, a transaction ID, point providing information, and delivery date information.

According to an exemplary embodiment, the display device 200 may request transaction information about a home shopping product from the seller server 100 based on a broadcasting channel and broadcasting hours, as will be described in detail below with reference to FIG. 3.

According to an exemplary embodiment, the display device 200 may request transaction information about a product selected by the user from the seller server 100 through a shopping application, as will be described in detail below with reference to FIG. 6.

According to another exemplary embodiment, information corresponding to the object, person, event, product, program displayed on the television may be requested by the display device 200.

In operation S240, the display device 200 may receive the transaction information about the selected product from the seller server 100. In other words, the display device 200 may receive a transaction ID, product information, seller information discount information (for example, a discount coupon and discount payment method information), promotion information (for example, point providing information), and delivery date information. The display device 200 may also receive information such as a link, identification code, name, etc. about an information provider, database, or content provider that provides additional information about the object, person, event, product, program, etc. displayed on the display device 200.

According to an exemplary embodiment, the display device 200 may receive transaction information about a plurality of products from the seller server 100 at once. Further, the display device 200 may receive the transaction information from the seller server 100 through a wired or wireless communication.

In operation S250, the display device 200 may transmit the received transaction information or other information corresponding to the object, person, event, product, and program displayed on the display device 200 to the mobile terminal 300 through the NFC. In other words, the display device 200 may encode the received transaction information or other information in an NFC data exchange format (NDEF). The display device 200 may also store the encoded transaction information or other information in an NFC tag. Here, when the mobile terminal 300 approaches the display device 200 within a radius of the NFC, the transaction information or other information stored in the NFC tag of the display device 200 is transmitted to the mobile terminal 300.

The display device 200 may encode the transaction information. Here, the display device 200 may encode the transaction information by using any one of various encoding algorithms. Examples of an encoding algorithm include RSA, LUC, Diffie-Hellman, Elliptic Curve, Snefru, CRC-32, CRC-16, MD2, MD4, MD5, SHA, and Naval.

According to an exemplary embodiment, the display device 200 may delete the transaction information transmitted to the mobile terminal 300 from the NFC tag. After the transaction information is transmitted to the mobile terminal 300, the display device 200 may immediately delete the transaction information from the NFC tag. Alternatively, the display device 200 may delete the transaction information from the NFC tag after a predetermined period of time.

The display device 200 may receive the payment authorization result about the product selected by the user from outside the display device 200. For example, the display device 200 may receive the payment authorization result from at least one of the seller server 100, the mobile terminal 300, and the payment server 400. The display device 200 may display the received payment authorization result on the screen.

A method of transmitting the transaction information about the home shopping product from the display device 200 to the mobile terminal 300 will now be described in detail with reference to FIGS. 3 and 4.

FIG. 3 is a flowchart illustrating a transaction information providing method about a home shopping product of the display device 200, according to an exemplary embodiment.

As shown in FIG. 3, in operation S310, the display device 200 may receive home shopping broadcast information or other broadcast information from a broadcast management server, and output a home shopping broadcast the other broadcast information. According to an exemplary embodiment, the display device 200 may receive an electronic program guide. The electronic program guide denotes information about broadcasting contents provided by a business operator for a viewer to easily select a channel. For example, the electronic program guide may include broadcast program names, channel names, broadcasting hours (a start time, a finish time, and duration), levels, program types, representative images, and detailed information (for example, casts, directors, producers, providers, rerun information, story lines, and previews).

In operation S320, the display device 200 may receive a selection on a home shopping product from the mobile terminal 300 or a selection of an object, person, event, product, and program displayed on the display device 200. In other words, the user may request to buy a home shopping product through the mobile terminal 300 while watching a home shopping broadcast or request additional information about the object, person, event, product, and program displayed on the display device 200. Here, the mobile terminal 300 may include a remote controller exclusive to the display device 200.

In operation S330, the display device 200 may extract a seller selling the home shopping product selected by the user, based on broadcasting channel information and broadcasting hour information of the home shopping product. In addition, the display device 200 may extract information such as a link, identification code, name, etc. about an information provider, database, or content provider that provides additional information about the object, person, event, product, and program displayed on the television. For example, the display device 200 may extract the seller by checking a broadcasting channel and broadcasting hours on the electronic program guide.

In operation S340, the display device 200 may request transaction information about the home shopping product or additional information from the seller server 100. According to an exemplary embodiment, the display device 200 may request the transaction information by transmitting information about the home shopping product selected by the user (for example, a product ID code, a product color, and a quantity of products) to the seller server 100.

In operation S350, the seller server 100 may check an on-air home shopping product and transmit the transaction information or additional information about the home shopping product selected by the user to the display device 200.

In operation S360, the display device 200 may store the transaction information or additional information received from the seller server 100 in NDEF, in the NFC tag.

In operation S370, the display device 200 may transmit the transaction information or additional information to the mobile terminal 300 through the NFC, as described below with reference to FIG. 4.

FIG. 4 illustrates screens for requesting transaction information about a home shopping product during a home shopping broadcast, according to an exemplary embodiment.

As shown in FIG. 4 (a), the display device 200 may output a home shopping broadcast about a suitcase. The broadcast may include two regions, a first display region displaying the product and a second display region with information about the product and menu items selectable by the user. Here, when the user wants to buy a suitcase while watching the home shopping broadcast, the user may select "PURCHASE" through the mobile terminal 300. In another exemplary embodiment, if a user wants request to additional information about the suitcase, the user may select a menu item requesting additional information (not shown).

As shown in FIG. 4 (b), the display device 200 may output a screen including menu items for selecting a payment method, in response to a purchase request of the user. A payment method provided by the display device 200 may be various. Examples of the payment method menu items may include menu items for a payment in points, payment through a telecommunication company (a payment method wherein a product price is added to a communication fee), a credit card payment in the display device 200, and a mobile bill presentation and payment (MBPP) in the mobile terminal 300.

Herein, the MBPP means a payment method based on the user through the mobile terminal 300. In other words, the user may directly request payment from the payment server 400 by receiving the transaction information through the mobile terminal 300 without having to transmit payment method information to an external terminal, such as a point of sales (POS) terminal or a seller terminal.

For example, the mobile terminal 300 may receive the transaction information from the display device 200 and extract the payment method information related to the user such that a payment process or purchase transaction is performed in the mobile terminal 300.

Accordingly, when the user selects the MBPP from various payment methods, the display device 200 may request transaction information about a suitcase from the seller server 100 based on a broadcasting channel and broadcasting hours. Then, the display device 200 receives the transaction information about the suitcase (for example, Product Code: abc, Price: $100, Quantity: 1, Seller ID: OOO, TID: XXXXXX), and transmit the transaction information to the mobile terminal 300 through the NFC.

A method of transmitting transaction information through a shopping application interlocked with the seller server 100 from the display device 200 to the mobile terminal 300 will now be described with reference to FIGS. 5 through 8.

Figure 5:
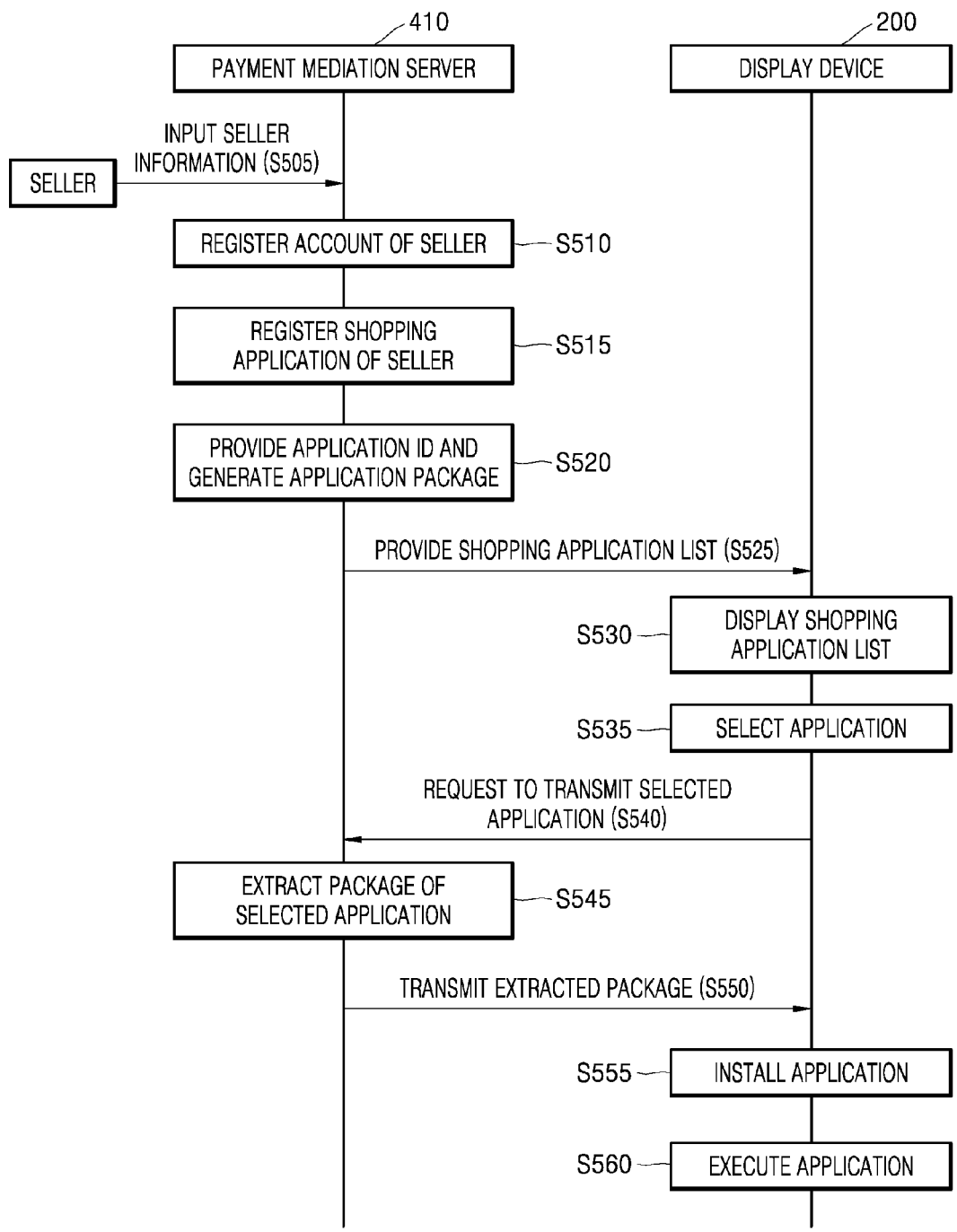
FIG. 5 is a flowchart illustrating a method of installing and executing a shopping application in a display device, according to an exemplary embodiment.

FIG. 5 is a flowchart illustrating a method of installing and executing a shopping application in the display device 200, according to an exemplary embodiment.

As shown in FIG. 5, the payment mediation server 410 may receive seller information from a seller in operation S505. For example, the payment mediation server 410 may receive a seller ID, personal ID information (for example, a password), and a seller bank account from the seller.

In operation S510, the payment mediation server 410 may register an account of the seller based on the seller information input from the seller. The payment mediation server 410 may provide a software development kit (SDK) to the seller to develop and distribute a shopping application executable in the display device 200. The seller may develop the shopping application by using the SDK.

In operation S515, the payment mediation server 410 may register the shopping application of the seller. Here, in operation S520, the payment mediation server 410 may provide an application ID to the shopping application, and manage the application ID in association with a seller ID. The payment mediation server 410 may package the application ID, a description about the shopping application, an application icon, the seller ID, bank account information of the seller, and the shopping application. A package generated as such may be stored in the payment mediation server 410 and managed as the application ID.

In operation S525, the payment mediation server 410 may provide a shopping application list that is not installed in the display device 200. In operation S530, the display device 200 may display the shopping application list on the screen.

The shopping application list according to an exemplary embodiment may include information about a plurality of shopping applications respectively interlocked with a plurality of seller servers (for example, application names, application icons, and seller ID information).

In operation S535, the display device 200 may receive a selection of the user on at least one application from the shopping application list. In operation S540, the display device 200 may request transmission of the selected application from the payment mediation server 410. Here, the display device 200 may transmit an application ID of the selected application to the payment mediation server 410.

In operation S545, the payment mediation server 410 may check the application ID and extract a package of the application selected by the user. Then, in operation S550, the payment mediation server 410 may transmit the extracted package to the display device 200.

In operation S555, the display device 200 may install the selected application by using the received package. In operation S560, the display device 200 may execute the installed application based on a user input.

A method of transmitting transaction information from the display device 200 to the mobile terminal 300 by using a shopping application of a seller installed in the display device 200 will now be described in detail with reference to FIG. 6.

Figure 6:
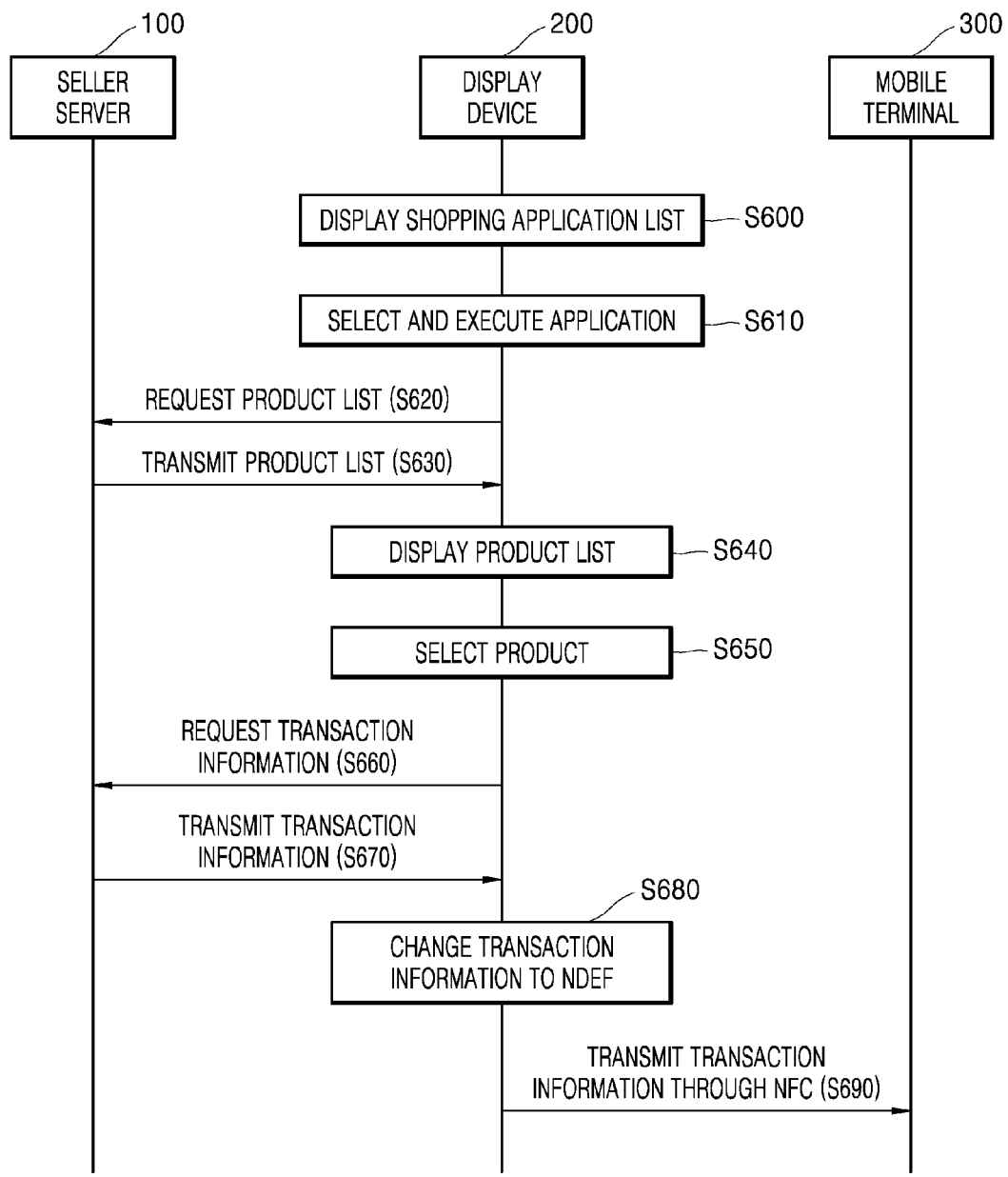
FIG. 6 is a flowchart illustrating a transaction information providing method of a display device through a shopping application, according to an exemplary embodiment.

FIG. 6 is a flowchart illustrating a transaction information providing method of the display device 200 through a shopping application, according to an exemplary embodiment.

In operation S600, the display device 200 may display a shopping application list on the screen. Here, the shopping application list may include an icon of a shopping application of a seller installed in the display device 200, an application name, and seller ID information.

In operation S610, the display device 200 may receive a selection of the user on at least one application from the shopping application list, and execute the selected application.

In operation S620, the display device 200 may request a product list from the seller server 100 interlocked with the selected application.

In operation S630, the seller server 100 may transmit the product list of the seller to the display device 200. In other words, the display device 200 receives the product list through the application selected by the user. Here, the display device 200 may also receive seller ID information from the seller server 100.

In operation S640, the display device 200 may display the product list received from the seller server 100 on the screen. The product list may include a product name, a product image, a product price, an available quantity, a user evaluation, and a seller ID.

In other words, when the user selects a shopping application of a certain seller, the user may check a product list provided by the certain seller.

In operation S650, the display device 200 may receive a selection of the user on at least one product in the product list. According to an exemplary embodiment, the selection of the user on the at least one product may be performed by a purchase determination or a payment request.

In operation S660, the display device 200 may request transaction information about the at least one product selected by the user from the seller server 100 through the shopping application of the seller. In operation S670, the seller server 100 may transmit the transaction information to the display device 200 in response to the request.

In operation S680, the display device 200 may change the received transaction information into NDEF. Here, the display device 200 may encode the transaction information into NDEF.

In operation S690, the display device 200 may transmit the transaction information to the mobile terminal 300 through an NFC.

A method of transmitting transaction information from the display device 200 to the mobile terminal 300 by using a shopping application of a seller will now be described in detail with reference to FIGS. 7 through 9.

Figure 7:
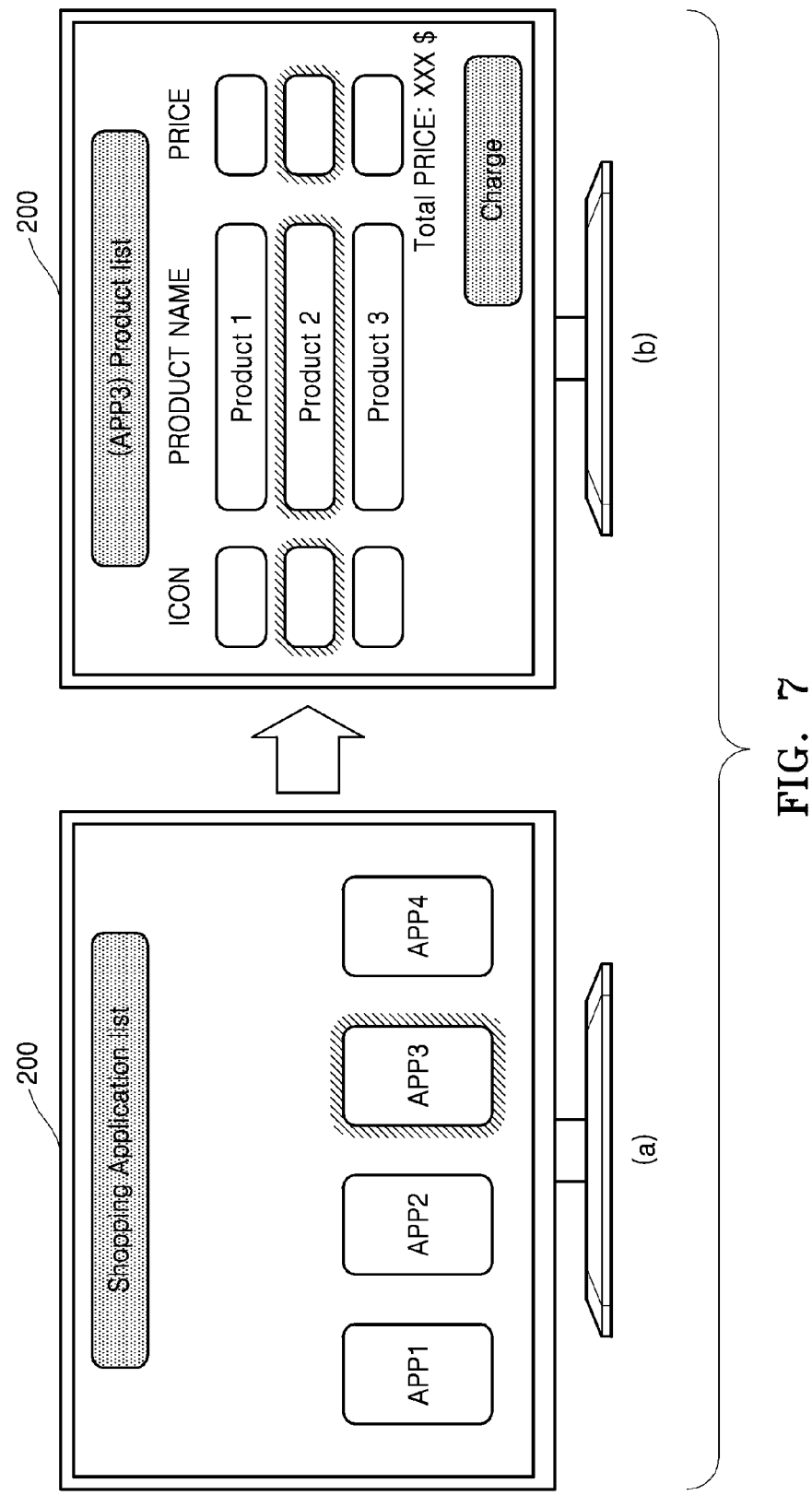
FIG. 7 (a) illustrates a screen for providing a shopping application list in a display device and FIG. 7 (b) illustrates a screen for providing a product list by executing a shopping application selected by a user, according to an exemplary embodiment.

FIG. 7 (a) illustrates a screen for providing a shopping application list in the display device 200 and FIG. 7 (b) illustrates a screen for providing a product list by executing a shopping application selected by a user, according to an exemplary embodiment.

As shown in FIG. 7 (a), the display device 200 may output the shopping application list installed in the display device 200. A plurality of shopping applications in the shopping application list may respectively correspond to a plurality of seller servers. For example, Application 1 may correspond to Seller Server 1, Application 2 may correspond to Seller Server 2, and Application 3 may correspond to Seller Server 3.

If the user selects Application 3 in the shopping application list, the display device 200 requests a product list from Seller Server 3 corresponding to Application 3.

As shown in FIG. 7 (b), the display device 200 may receive the product list from Seller Server 3 through Application 3, and display the product list on the screen. Here, the user checks the product list of Seller 3, and selects a product to be purchased. For example, the user may select Product 2.

Figure 8:
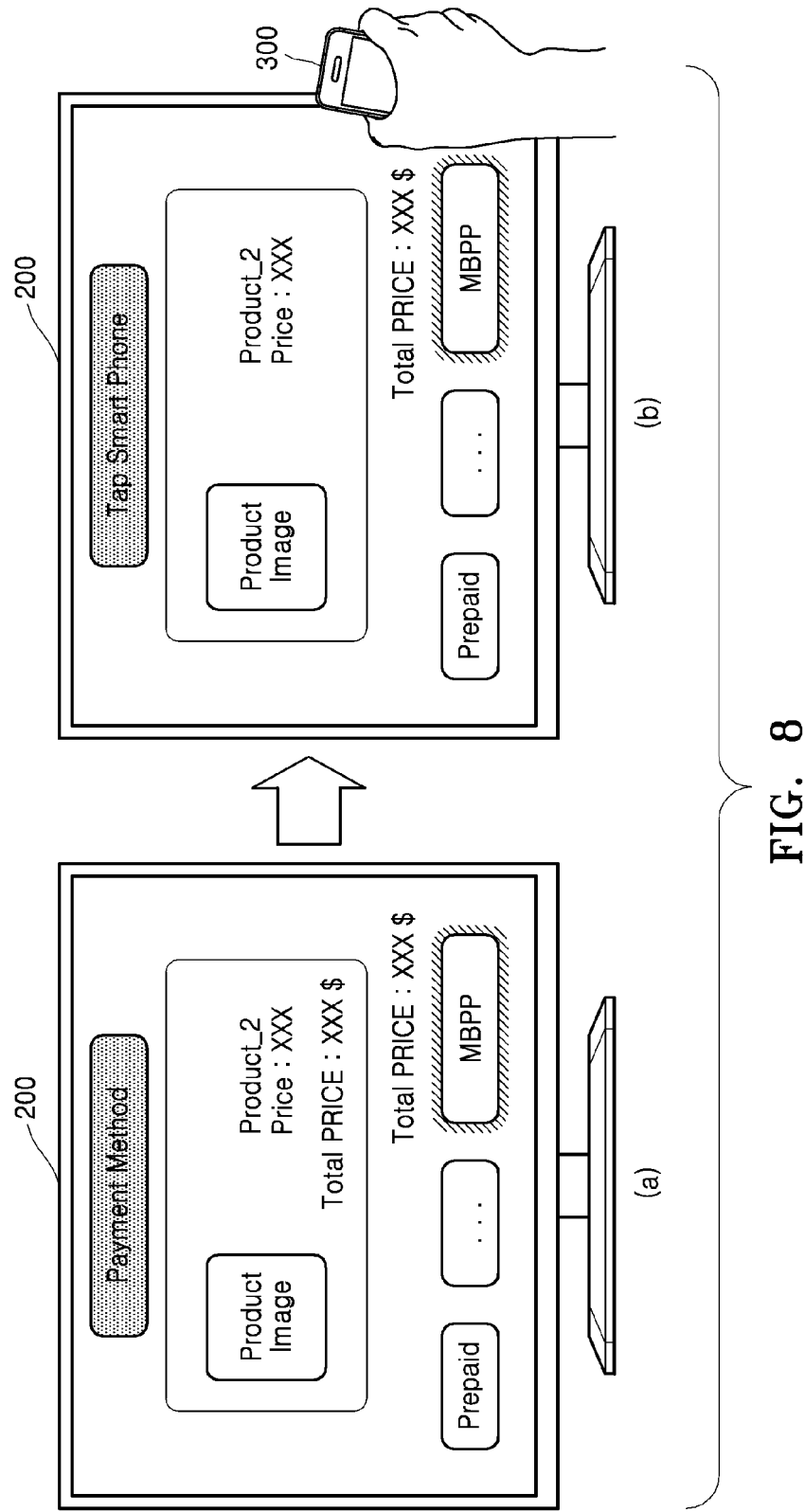
FIG. 8 (a) illustrates a screen for selecting a payment method in a display device and FIG. 8 (b) illustrates a screen for providing transaction information to a mobile terminal through a near field communication (NFC) in a display device, according to an exemplary embodiment.

FIG. 8 (a) illustrates a screen for selecting a payment method in the display device 200 and FIG. 8 (b) illustrates a screen for providing transaction information to the mobile terminal 300 through an NFC in the display device 200, according to an exemplary embodiment.

As shown in FIG. 8 (a), the user may select a payment method about Product 2. If the user selects MBPP as the payment method, the display device 200 may request transaction information about Product 2 from Seller Server 3. Here, Seller Server 3 may transmit the transaction information about Product 2 (for example, a product code, a product price, a transaction ID, and ID of Application 3) to the display device 200.

As shown in FIG. 8 (b), the display device 200 may change the transaction information about Product 2 received from Seller Server 3 to NDEF, and store the transaction information in an NFC tag. Then, the display device 200 may display a notification "Please tag the mobile terminal 300 (Tap Smart Phone)". Here, when the user touches the mobile terminal 300 to the NFC tag. The display device 200 may transmit the transaction information about Product 2 through the NFC to the mobile terminal 300, as will be described below with reference to FIG. 9.

Figures 9, 10:
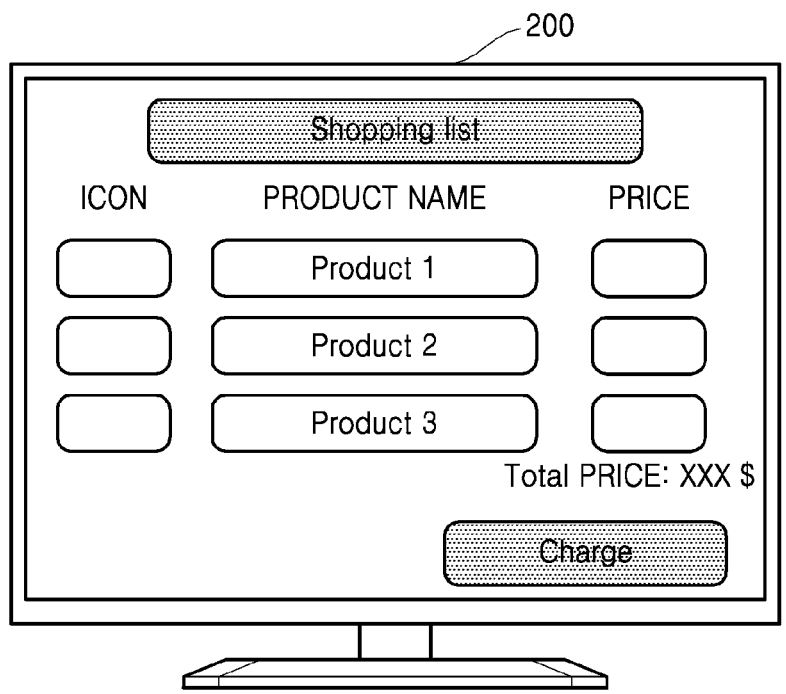
FIG. 9 illustrates transaction information encoded in an NFC data exchange format (NDEF), according to an exemplary embodiment.
FIG. 10 illustrates a screen for providing a shopping list (shopping basket) in a display device, according to an exemplary embodiment.

FIG. 9 illustrates transaction information encoded into NDEF, according to an exemplary embodiment.

As shown in FIG. 9, according to an exemplary embodiment, the display device 200 may encode the transaction information into NDEF, wherein the transaction information may include a field comprising subfields including information about the display device 200 (for example, a smart TV and a Park's smart TV), and an MBPP request field comprising subfields including information about a seller ID (for example, 1234), an application ID (for example, app-7890), and product information (for example, Product 2, Price XXX, and price unit $).

FIG. 10 illustrates a screen for providing a shopping list (shopping basket) in the display device 200, according to an exemplary embodiment.

As shown in FIG. 10, the display device 200 may receive transaction information respectively corresponding to a plurality of products from the seller server 100. According to an exemplary embodiment, the display device 200 may receive the transaction information respectively corresponding to the plurality of products from one seller server 100 or a plurality of seller servers 100.

The display device 200 according to an exemplary embodiment may display a list of the transaction information on the screen.

Accordingly, the user may select products to be purchased for a predetermined period of time, and receive transaction information about the selected products from the display device 200 through the mobile terminal 300 at once. In other words, when the user touches the mobile terminal 300 to the display device 200, the display device 200 transmits the transaction information at once to the mobile terminal 300 through an NFC.

Alternatively, the user may select and transmit transaction information to be used from the list of transaction information on the display device 200 to the mobile terminal 300.

A payment processing method of the mobile terminal 300 by using transaction information transmitted from the display device 200 will now be described in detail.

Figure 11:
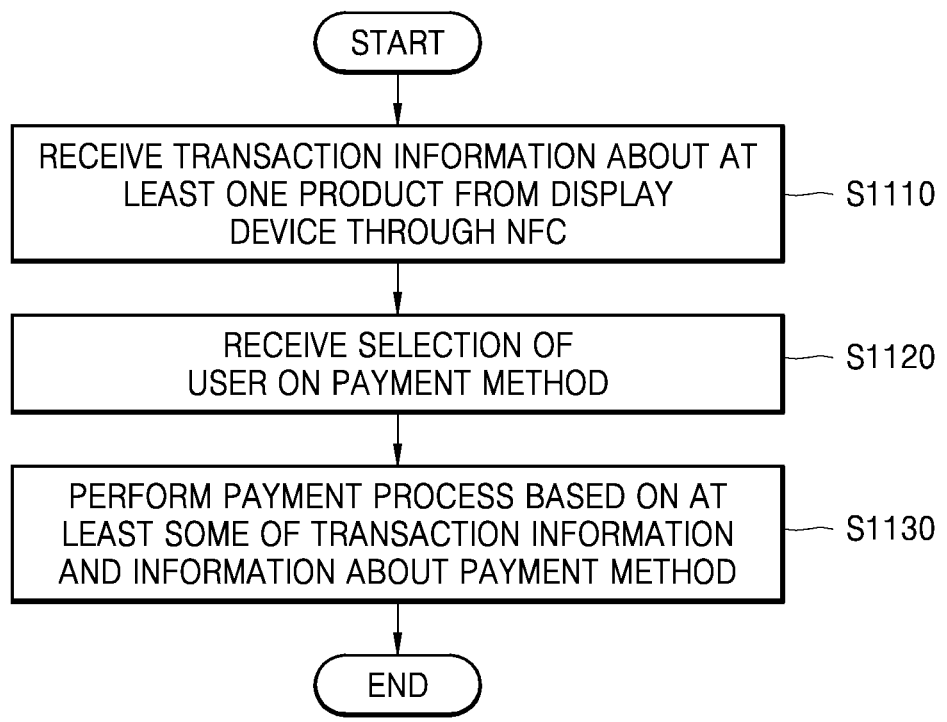
FIG. 11 is a flowchart illustrating a payment processing method of a mobile terminal, according to an exemplary embodiment.

FIG. 11 is a flowchart illustrating a payment processing method of the mobile terminal 300, according to an exemplary embodiment.

In operation S1110, the mobile terminal 300 may receive transaction information about at least one product displayed on the display device 200 from the display device 200 through an NFC. The transaction information may include at least one of product information (for example, a product price), seller information (for example, seller ID information or an application ID), a transaction ID, point providing information, discount payment method information, and delivery date information.

As described above, at least one product displayed on the display device 200 may be at least one home shopping product on a home shopping broadcast, or at least one on-line shopping product provided through a shopping application of a seller.

According to an exemplary embodiment, the display device 200 may receive transaction information encoded in NDEF. The display device 200 may decode the transaction information encoded in NDEF.

In operation 1120, the mobile terminal 300 may receive a selection on a payment method related to the user of the mobile terminal 300. The payment method related to the user may include at least one of a credit card, a debit card, a credit transfer, securities, a coupon, and an account-based payment method. The payment method related to the user may not only be a magnet plate card, but may also be a mobile card or a virtual card stored in a security region of the mobile card 300 in a program format. The account-based payment method is an account being a payment method by interlocking a credit card or bank account to the account of the user.

According to an exemplary embodiment, when there is only one payment method related to the user, a check on the payment method may be considered as a selection on the payment method.

In operation S1130, the mobile terminal 300 may perform a payment process on a product based on at least a part of the received transaction information and information about the payment method. In other words, the mobile terminal 300 may transmit a payment request including the at least a part of the transaction information and the information about the payment method to the payment server 400.

The display device 200 according to an exemplary embodiment may transmit all or a part of the transaction information to the payment server 400. For example, the display device 200 may request a payment while transmitting only seller ID information (or an application ID) and product price information from among the transaction information to the payment server 400.

The information about the payment method according to an exemplary embodiment may include, if the payment method is a credit card, a card number, an expiration date, and a CVC value, and if the payment method is a credit transfer, an account number, a bank, and an account holder.

A payment processing method of the mobile terminal 300 will now be described in detail with reference to FIG. 12.

Figure 12:
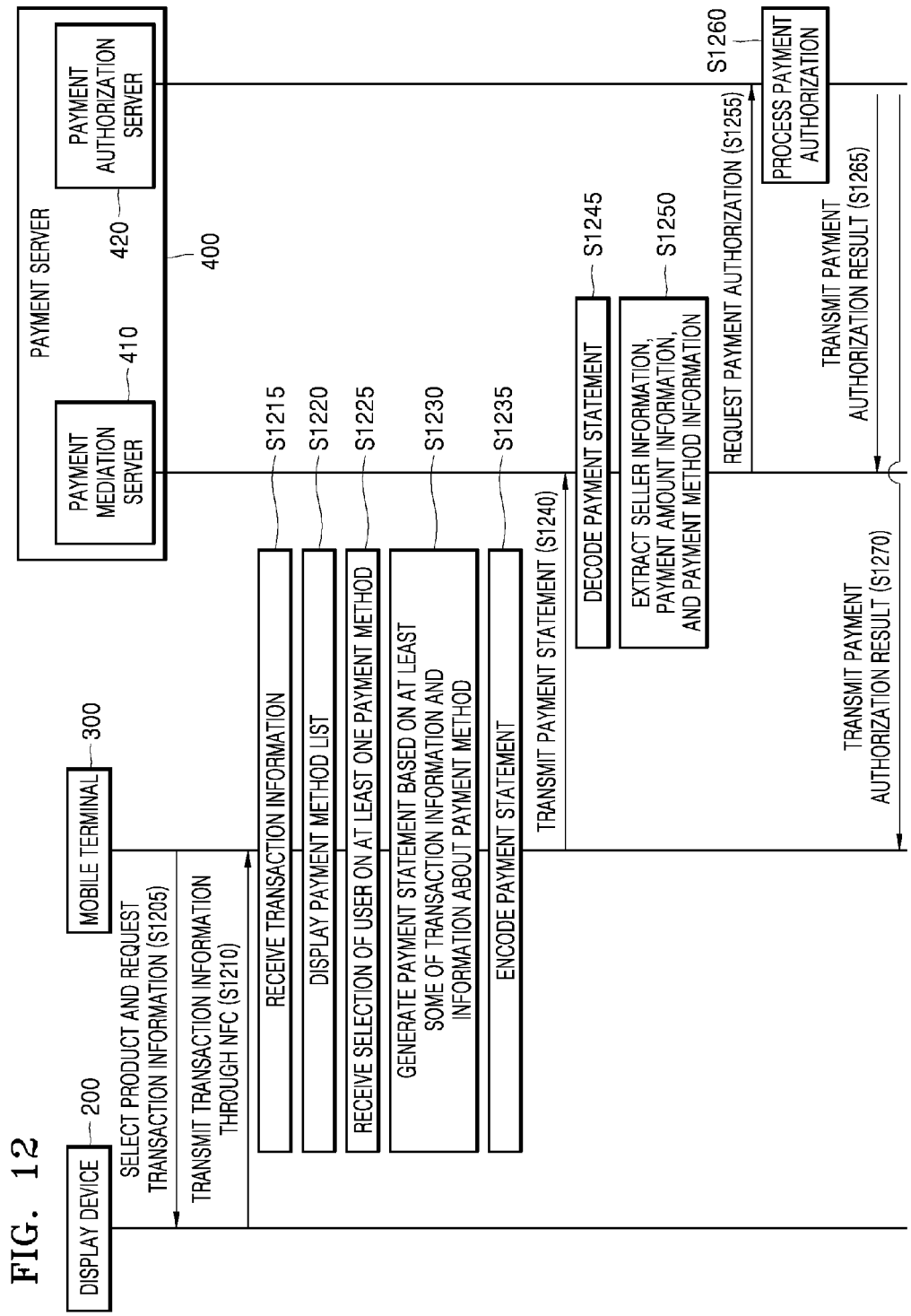
FIG. 12 is a flowchart illustrating a payment processing method of a mobile terminal, according to aspect of another exemplary embodiment.

FIG. 12 is a flowchart illustrating a payment processing method of the mobile terminal 300, according to an exemplary embodiment.

In operation S1205, the display device 200 may receive a selection of a product and a request for transaction information from the mobile terminal 300. In other words, the user may select at least one of products displayed on the display device 200 through the mobile terminal 300, and request transaction information about the selected product.

According to an exemplary embodiment, the mobile terminal 300 may request transaction information about a product displayed on the display device 200 from the display device 200 through an NFC, Bluetooth, an infrared-ray communication, Zigbee, or a WLAN.

In operation S1210, the display device 200 may transmit the transaction information about the product through the NFC, and in operation S1215, the mobile terminal 300 may be placed near the display device 200 within a radius of the NFC to receive the transaction information from an NFC tag of the display device 200. Here, according to an exemplary embodiment, the mobile terminal 300 may display the transaction information received from the display device 200.

The mobile terminal 300 may further receive at least one of location information and ID information of the display device 200 from the display device 200.

According to an exemplary embodiment, the mobile terminal 300 may drive a mobile wallet application to be switched to a mode for receiving a selection on a payment method while receiving the transaction information.

Accordingly in operation S1220, the mobile terminal 300 may display a payment method list related to the user through the mobile wallet application. In operation S1225, the mobile terminal 300 may receive a selection of the user on at least one payment method from the payment method list. For example, the user may select, as a payment method, a mobile card A, a gift card B, a credit transfer, or an account-based payment. Here, the mobile terminal 300 may display information about the payment method selected by the user on the screen.

According to an exemplary embodiment, the mobile terminal 300 may receive a selection of the user on a plurality of payment methods. For example, the user may select the mobile card A and the gift card B as payment methods such that a payment amount of the product is split and charged to the mobile card A and the gift card B. Alternatively, the user may get a discount on the payment amount by using an OO coupon, and then request payment authorization on the remaining payment amount by using the mobile card A. Here, the user selects the OO coupon and the mobile card A as the payment methods.

According to an exemplary embodiment, the mobile terminal 300 may recommend a payment method. For example, the mobile terminal 300 may obtain discount rate information regarding a plurality of payment methods related to the user of the mobile terminal 300, based on the transaction information received from the display device 200. Then, the mobile terminal 300 may recommend a payment method based on the obtained discount rate information. In other words, the mobile terminal 300 may recommend payment methods in an order of a high discount rate.

According to an exemplary embodiment, the mobile terminal 300 may recommend a payment method based on use pattern information of the user on a plurality of payment methods. For example, when the user mainly uses a mobile card X for shopping, the mobile terminal 300 may recommend the mobile card X as the payment method. Alternatively, when a main card of the user is a mobile card Y, the mobile terminal 300 may basically recommend the mobile card Y as the payment method.

According to an exemplary embodiment, the mobile terminal 300 may receive a selection of the user on the recommended payment method.

The mobile terminal 300 may receive authentication information about the payment method from the user. Here, the mobile terminal 300 may authenticate access authority of the user on the payment method based on the received authentication information.

The authentication information according to an exemplary embodiment may include at least one of personal ID information about a certificate, personal ID information corresponding to a payment method, pattern input information corresponding to a payment method, and fingerprint information of the user. According to an exemplary embodiment, the authentication information may be iris information, vein information, voice information, or palm print information.

In operation S1230, the mobile terminal 300 may generate a payment statement based on at least a part of the transaction information and information about the payment method. In operation S1235, the mobile terminal 300 may encode the payment statement. Here, any one of various encoding algorithms may be used. Examples of encoding algorithms include RSA, LUC, Diffie-Hellman, Elliptic Curve, Snefru, CRC-32, CRC-16, MD2, MD4, MD5, SHA, and Naval.

In operation S1240, the mobile terminal 300 may transmit the payment statement to the payment mediation server 410. According to an exemplary embodiment, since the payment statement is directly generated in the mobile terminal 300 and transmitted to the payment mediation server 410, information about a personal payment method of the user may be prevented from being leaked.

In operation S1245, the payment mediation server 410 may decode the payment statement. In operation S1250, the payment mediation server 410 may extract seller information (for example, seller ID information and an application ID), payment amount information, and payment method information from the decoded payment statement.

In operation S1255, the payment mediation server 410 may request a payment by transmitting the extracted seller information, payment amount information, and payment method information to the payment authorization server 420.

In operation S1260, the payment authorization server 420 may process payment authorization. In operation S1265, the payment authorization server 420 may transmit a payment authorization result to the payment mediation server 410. Here, the payment mediation server 410 may deposit the payment amount to a bank account of the seller based on the seller information (for example, the seller ID information and the application ID).

In operation S1270, the payment authorization server 420 may transmit the payment authorization result to the mobile terminal 300. Here, the mobile terminal 300 may output the payment authorization result on the screen.

The payment authorization server 420 may transmit the payment authorization result to the seller server 100 or the display device 200.

The payment processing method of the mobile terminal 300 will now be described in more detail with reference to FIGS. 13 through 17.

Figure 13:
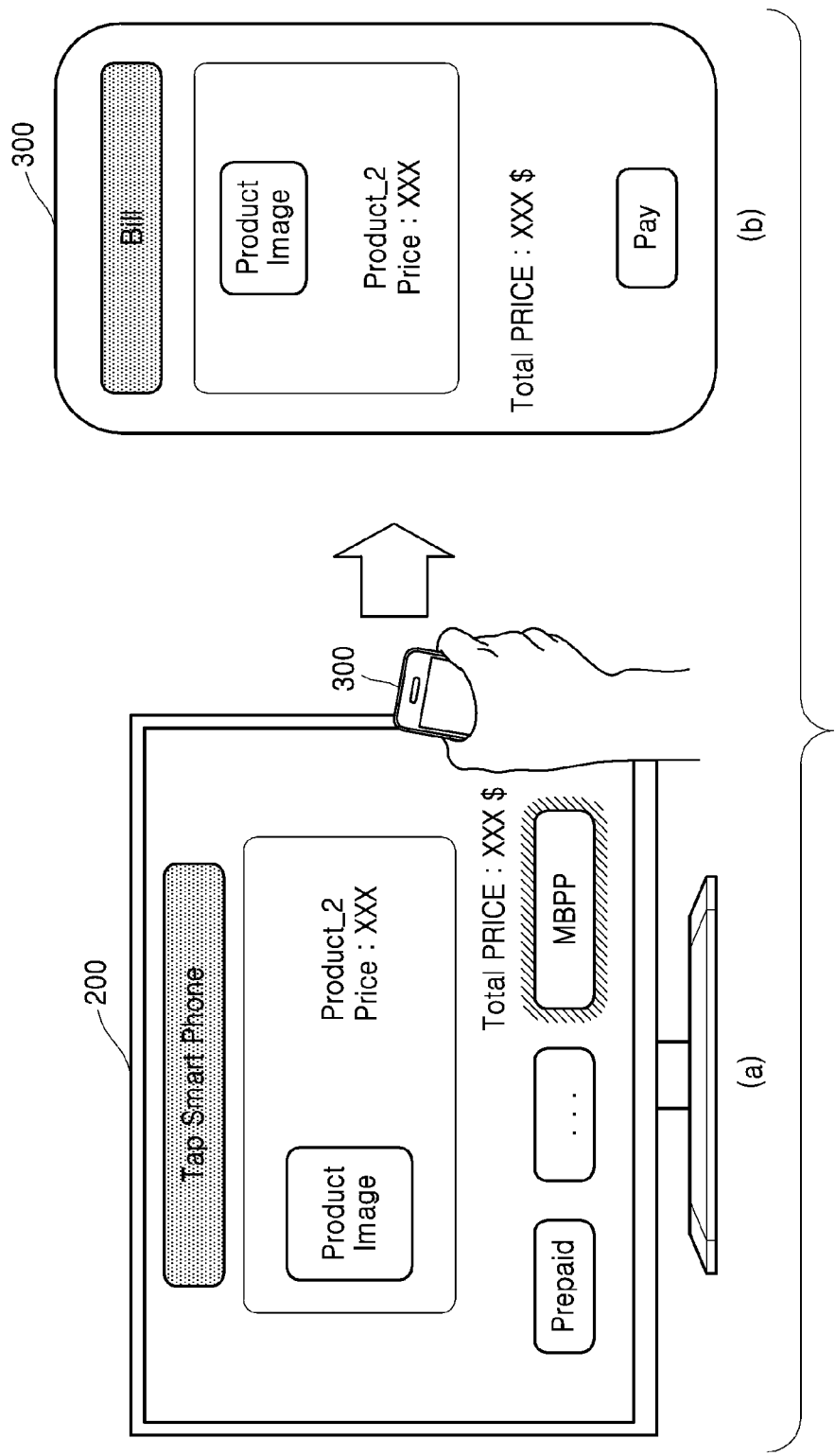
FIG. 13 illustrates screens for a mobile terminal obtaining and displaying transaction information through an NFC, according to an exemplary embodiment.

FIG. 13 illustrates screens for the mobile terminal 300 obtaining and displaying transaction information through an NFC, according to an exemplary embodiment.

As shown in FIG. 13 (a), when a notification message "Tag Smart Phone" is output on the display device 200, the user may tag the mobile terminal 300 to the display device 200.

At this time, as shown in FIG. 13 (b), the mobile terminal 300 may receive transaction information (a product image, a product name, and a product price) about Product 2 selected by the user from the display device 200, and display the transaction information on the screen. The user may check the transaction information displayed on the mobile terminal 300 and perform a payment.

Figure 14:
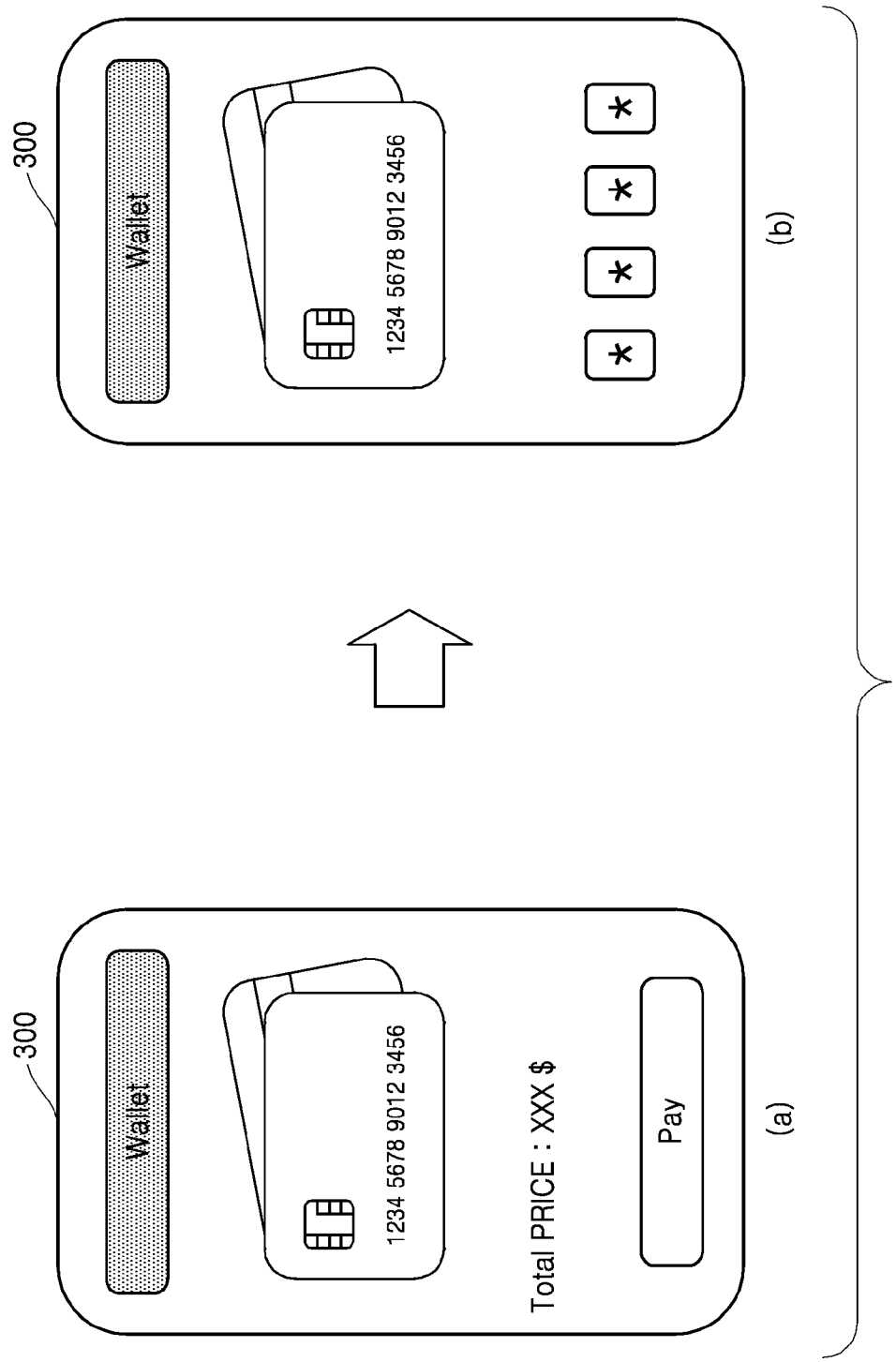
FIG. 14 illustrates screens for describing a payment method according to an exemplary embodiment.

FIG. 14 illustrates screens for describing a payment method according to an exemplary embodiment.

As shown in FIG. 14 (a), according to an exemplary embodiment, when the transaction information is received from the display device 200, the mobile terminal 300 may execute the mobile wallet application and be switched to a mode for reading a mobile card.

At this time, as shown in FIG. 14 (b), the mobile terminal 300 may request authentication information (for example, a password of a mobile card) about a payment method from the user. The mobile terminal 300 may authenticate access authority on a mobile card based on the authentication information received from the user. When authentication is successful, the mobile terminal 300 may extract card information required for a payment from a security region. An authentication method may vary as described above.

Figure 15:
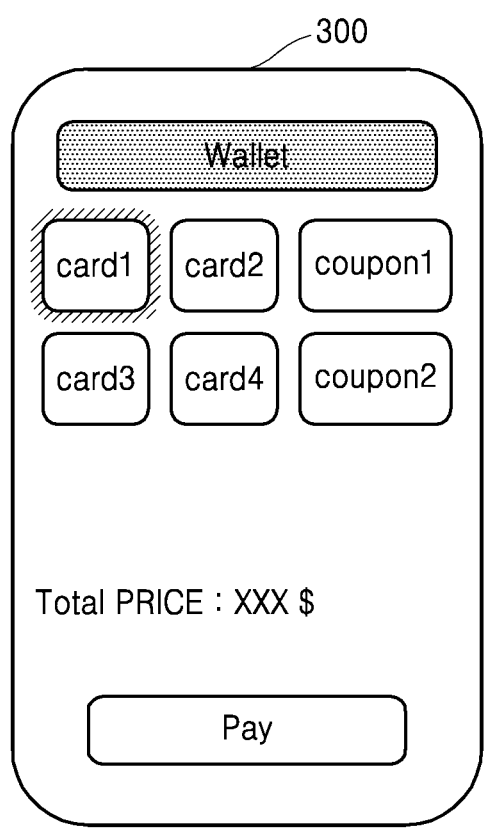
FIG. 15 illustrates a screen displaying a payment method list, according to an exemplary embodiment.

FIG. 15 illustrates a screen displaying a payment method list, according to an exemplary embodiment.

As shown in FIG. 15, according to an exemplary embodiment, when there are a plurality of payment methods related to the user, the mobile terminal 300 may output a payment method list on the screen. Here, the user may check the payment method list and select Mobile Card 1 as a payment method for Product 2.

Figure 16:
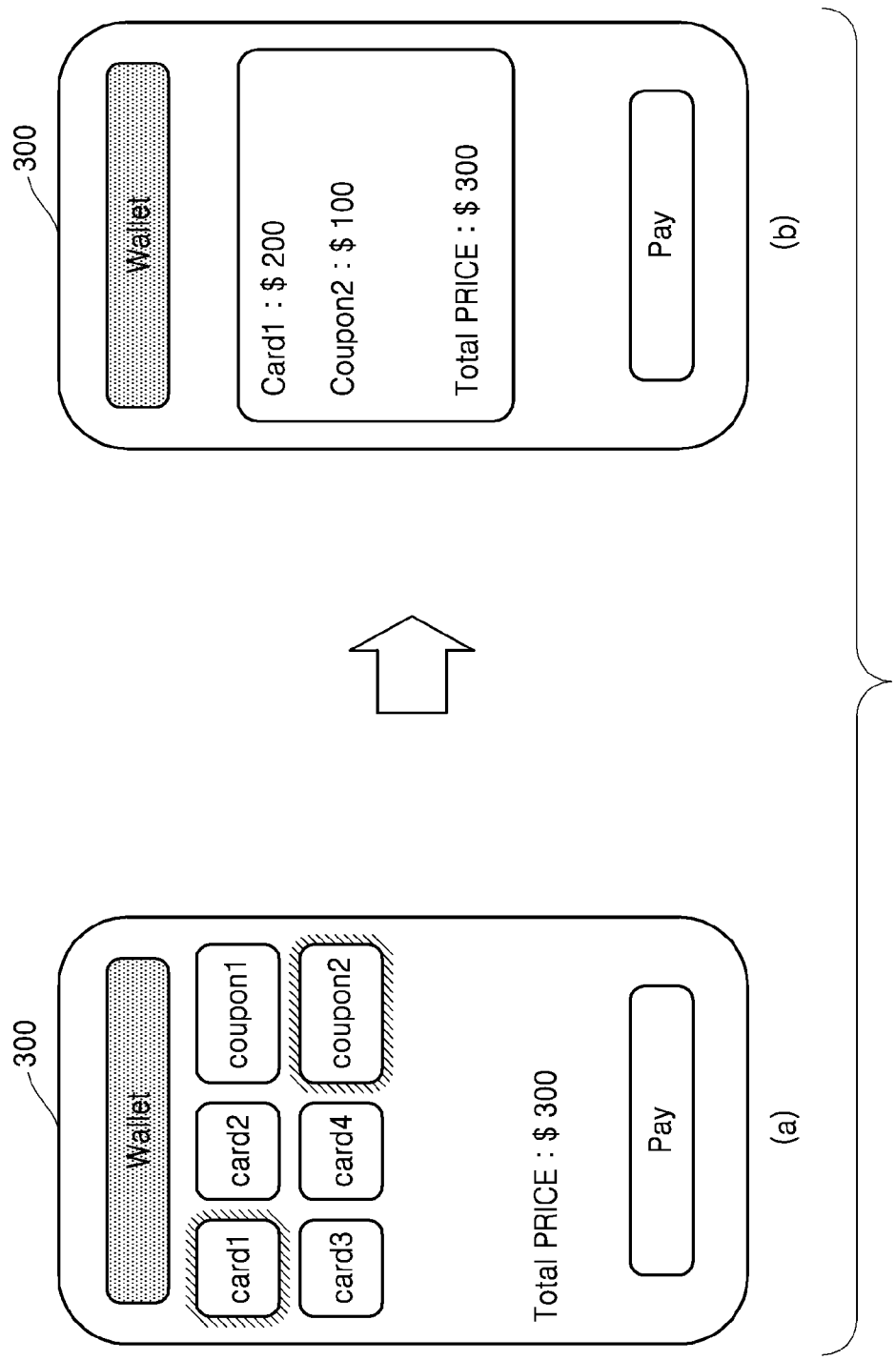
FIG. 16 illustrates screens for performing payment by combining a plurality of payment methods, according to an exemplary embodiment.

FIG. 16 illustrates screens for performing payment by combining a plurality of payment methods, according to an exemplary embodiment.

As shown in FIG. 16 (a), the user may select a plurality of payment methods (Card 1 and Coupon 2) from a payment method list. At this time, as shown in FIG. 16 (b), the mobile terminal 300 may pay $100 with Coupon 2 and $200 with Card 1, from a payment amount of $300.

Figure 17:
FIG. 17 illustrates a screen for providing a shopping list (shopping basket) in a mobile terminal, according to an exemplary embodiment.

FIG. 17 illustrates a screen for providing a shopping list (shopping basket) in the mobile terminal 300, according to an exemplary embodiment.

According to an exemplary embodiment, the mobile terminal 300 may receive transaction information respectively corresponding to a plurality of products from the display device 200 through an NFC. The mobile terminal 300 may display a list of the received transaction information respectively corresponding to the plurality of products. Here, the user may check the transaction information and select a product to be paid. For example, when the user selects Product 1 and Product 2, the mobile terminal 300 may pay for Product 1 and Product 2 at once.

According to an exemplary embodiment, the mobile terminal 300 may receive transaction information from different display devices. For example, the mobile terminal 300 may receive transaction information about Product 1 from a kiosk, about Product 2 from a smart TV, and about Product 3 from a vending machine. Here, the mobile terminal 300 according to an exemplary embodiment may further receive location information of the display device 200 from the display device 200.

According to an exemplary embodiment, the mobile terminal 300 may transmit information about Product 1 to a second display device after receiving the information about Product 1 from a first display device. Here, the second display device may request and receive transaction information about Product 1 from the seller server 100, and then transmit the transaction information about Product 1 to the mobile terminal 300.

Figure 18:
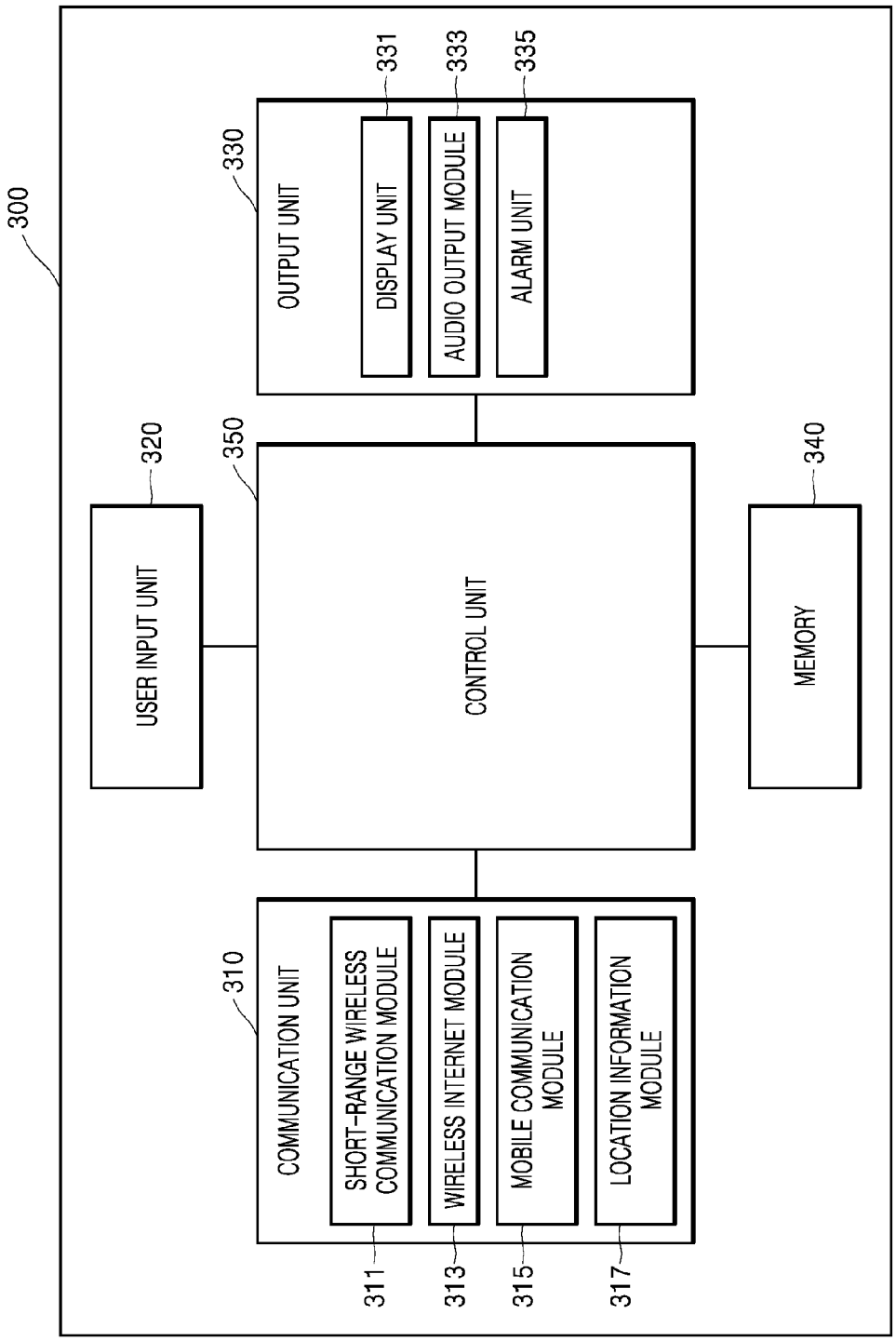
FIG. 18 is a block diagram of a mobile terminal according to an exemplary embodiment.

FIG. 18 is a block diagram of the mobile terminal 300 according to an exemplary embodiment.

As shown in FIG. 18, the mobile terminal 300 according to an exemplary embodiment may include a communication unit 310, a user input unit 320, an output unit 330, a memory 340, and a control unit 350 (e.g., a controller). However, not all components of FIG. 18 are essential. The mobile terminal 300 may be realized by using more or less components than those shown in FIG. 18.

The components of the mobile terminal 300 will now be described in detail.

The communication unit 310 may include one or more components enabling a communication between the mobile terminal 300 and the display device 200 or a communication between the mobile terminal 300 and the payment server 400. For example, the communication unit 310 may include a short-range wireless communication module 311, a wireless internet module 313, a mobile communication module 315, and a location information module 317.

The short-range wireless communication module 311 is a module for establishing short-range wireless communication. Examples of a short-range wireless communication technology include WLAN (Wi-Fi), Bluetooth, Zigbee, WFD, UWB, Infrared-ray communication (Infrared data association (IrDA)), Near Field Communication (NFC), but are not limited thereto.

The wireless internet module 313 is a module for a wireless internet access, and may be embedded in or disposed outside the mobile terminal 300.

The mobile communication module 315 transmits and receives a wireless signal to and from at least one of a base station on a mobile communication network, the display device 200 outside the mobile terminal 300, and the payment server 400. Here, examples of the wireless signal include a voice call signal, an image call signal, and data in any one of various formats according to text/multimedia message transmission and reception.

The location information module 317 is a module for checking or obtaining a location of the mobile terminal 300. An example of the location information module 317 includes a Global Positioning System (GPS) module. The GPS module receives location information from a plurality of satellites.

The communication unit 310 may receive transaction information about at least one product displayed on the display device 200 from the display device 200 through the NFC. Here, the communication unit 310 may receive transaction information encoded in NDEF. The communication unit 310 may further receive at least one of location information and ID information of the display device 200.

According to an exemplary embodiment, the communication unit 310 may communicate directly with the display device 200 or communicate with an intermediate device (not shown) such as a set-up top box, dongle, etc. connected to the display device 200. The intermediate device may be connected to the display device 200 through a data port including an HDMI, DVI, USB or other interface.

According to an exemplary embodiment, the communication unit 310 may request the transaction information from the display device 200 through the NFC.

According to an exemplary embodiment, the mobile device 300 may also receive the transaction information or other information by detecting an audible or inaudible sound that is encoded with the transaction information or other information by using a microphone or other device (not shown).

According to an exemplary embodiment, the mobile device 300 may also receive the transaction information or other information by capturing an image from the display device 200 by using an image sensor or other imaging device (not shown). The captured image may include display device information, product information and/or transaction information that is detectable by the mobile device 300 or may be compared with images in an image database to extract display device information, product information and/or transaction information.

The communication unit 310 may receive a payment authorization result on a payment request from the payment server 400. According to an exemplary embodiment, the communication unit 310 may receive a payment authorization result on a payment request from the payment server 400 through the display device 200.

The user input unit 320 may be used by the user to input data for controlling the mobile terminal 300. For example, the user input unit 320 may include a keypad, a dome switch, a touch pad (a contact capacitance type, a pressure resistance film type, an infrared ray detecting type, a surface ultrasonic conducting type, an integral tension measuring type, or a piezo-effect type), a jog wheel, or a jog switch. Specifically, a touch screen is formed when the touch pad forms a mutual layer structure with a display unit 331.

The user input unit 320 may receive a selection on a payment method related to the user. The user input unit 320 may receive a selection of the user on a recommended payment method.

According to an exemplary embodiment, the user input unit 320 may receive authentication information about the payment method from the user. The authentication information according to an exemplary embodiment may include at least one of personal ID information about a certificate, personal ID information corresponding to a payment method, pattern input information corresponding to a payment method, and fingerprint information of the user.

The output unit 330 is used to output an audio signal, a video signal, or an alarm signal, and may include the display unit 331, an audio output module 333, and an alarm unit 335.

The display unit 331 outputs and displays information processed in the mobile terminal 300. For example, the display unit 331 may display transaction information received from the display device 200 and information about a payment method selected by the user. The display unit 331 may display a list of transaction information respectively corresponding to a plurality of products, i.e., a shopping list, or display a list of a plurality of payment methods.

The memory 340 may store a program for processing and controlling the control unit 350. The memory 340 may perform a function for storing input and output data. For example, the memory 340 may store the transaction information received from the display device 200 and the information about the payment method related to the user.

Examples of the memory 340 include storage media, such as a flash memory, a hard disk type memory, a multimedia card micro type memory, a card type memory (for example, SD or XD memory), a random access memory (RAM), static RAM (SRAM), a read-only memory (ROM), an electrically erasable programmable ROM (EEPROM), a programmable ROM (PROM), a magnetic memory, a magnetic disk, and an optical disk. The mobile terminal 300 may manage a web storage unit performing a storage function on the Internet.

The control unit 350 generally controls overall operations of the mobile terminal 300. In other words, the control unit 350 may control the communication unit 310, the user input unit 320, the output unit 330, and the memory 340. The control unit 350 may be embodied by a processor, microprocessor, etc.

According to an exemplary embodiment, the control unit 350 may perform a payment process based on at least a part of the transaction information received from the display device 200 and the information about the payment method selected by the user. In other words, the control unit 350 may transmit a payment request including at least a part of the transaction information and the information about the payment method selected by the user to the payment server 400 through the communication unit 310.

For example, the control unit 350 may generate a payment statement including at least a part of the transaction information and the information about the payment method selected by the user. Then, the control unit 350 may encode the generated payment statement and transmit the encoded payment statement to the payment server 400.

The control unit 350 according to an exemplary embodiment may decode the transaction information when the transaction information encoded in NDEF is received.

According to an exemplary embodiment, the control unit 350 may obtain discount rate information about a plurality of payment methods based on the transaction information received from the display device 200, and recommend a payment method based on the obtained discount rate information.

Alternatively, the control unit 350 may recommend a payment method based on use pattern information of the user on the plurality of payment methods.

The control unit 350 may authenticate access authority of the user on a payment method based on authentication information received from the user.

FIG. 19 is a block diagram of the display device 200 according to an exemplary embodiment.

As shown in FIG. 19, the display device 200 according to an exemplary embodiment may include an output unit 210, a selection unit 220, a communication unit 230, and a control unit 240 (e.g., a controller).

However, not all components of FIG. 19 are essential. The display device 200 may be realized by using more or less components than those shown in FIG. 19.

The components of the display device 200 will now be described in detail.

The output unit 210 is used to output an audio signal, a video signal, or an alarm signal, and may include a display unit 211, an audio output module 212, and an alarm unit (not shown).

The display unit 211 outputs and displays information processed in the display device 200. For example, the display unit 211 may display at least one product. According to an exemplary embodiment, the display unit 211 may display a product by driving a shopping application or through a home shopping broadcast.

The display unit 211 according to an exemplary embodiment may display a product list and seller ID information received from the display device 200 on a screen. The display unit 211 may display a list of a plurality of shopping applications respectively interlocked with a plurality of seller servers.

The display unit 211 may display transaction information received from the seller server 100 on the screen. Here, the display unit 211 may display a list of transaction information respectively corresponding to a plurality of products.

According to an exemplary embodiment, the display unit 211 may receive a payment authorization result from outside the display device 200 and display the payment authorization result on the screen.

When a touch screen is formed as the display unit 211 and a touch pad forms a layer structure, the display unit 211 may also be used as an input device as well as an output device. The display unit 211 may include at least one of a liquid crystal display, a thin-film transistor-liquid crystal display, an organic light-emitting diode, a flexible display, a 3-dimensional (3D) display, an electrophoretic display, and a transparent display.

The audio output module 212 outputs audio data received from the communication unit 230 or stored in a memory in a recording mode, a voice recognizing mode, or a broadcast receiving mode. The audio output module 212 may include a speaker or a buzzer.

The selection unit 220 may select a product to be transacted from at least one product displayed on the display device 200, based on an external input. For example, the selection unit 220 may select an on-air product on the display device 200 at a point in time when the external input is received. Alternatively, the selection unit 220 may receive a user input on at least one product from the product list to select a product to be transacted.

The communication unit 230 may include one or more components enabling a communication between the display device 200 and the seller server 100 or a communication between the display device 200 and the mobile terminal 300. For example, the communication unit 230 may include a broadcast reception module 231, a short-range wireless communication module 232, a location information module 233, a wired internet module 234, and a wireless internet module 235.

The broadcast reception module 231 receives a broadcast signal and/or broadcast-related information from an external broadcast management server through a broadcasting channel. Examples of the broadcasting channel include a satellite channel and a terrestrial channel.

The short-range wireless communication module 232 is a module for establishing short-range wireless communication. Examples of a short-range wireless communication technology include WLAN (Wi-Fi), Bluetooth, Zigbee, WFD, UWB, and Infrared-ray communication (IrDA), Near Field Communication (NFC), but are not limited thereto.

The location information module 233 is a module for checking or obtaining the location of the display device 200. For example, the location information module 233 may be a GPS module. The GPS module receives location information from a plurality of satellites. Here, the location information may include coordinate information indicated in latitude and longitude.

The wired internet module 234 is a module for a wired internet access. The wireless internet module 235 is a module for a wireless internet access, and may be embedded in or disposed outside the display device 200.

The communication unit 230 may receive an external input on a selection on a product to be transacted through one of an infrared-ray communication, an NFC, Bluetooth, WFD, UWB, and a WLAN.

The communication unit 230 may request transaction information about the product to be transacted from the seller server 100, and receive the transaction information from the seller server 100. Here, the communication unit 230 may request transaction information about a home shopping product from the seller server 100 based on broadcasting channel information and broadcasting hour information.

The communication unit 230 may transmit the received transaction information to the mobile terminal 300 through an NFC. Here, the communication unit 230 may transmit the transaction information encoded in NDEF to the mobile terminal 300.

According to an exemplary embodiment, the communication unit 230 may communicate directly with the mobile terminal 300 or communicate with an intermediate device such as a set-up top box, dongle, etc. connected to the mobile terminal 300. The intermediate device may be connected to the mobile terminal 300 through a data port such as an HDMI, DVI, USB or other interface.

The communication unit 230 may receive the product list and the seller ID information from the seller server 100. The communication unit 230 may receive the transaction information respectively corresponding to the plurality of products from the seller server 100.

The communication unit 230 may receive the payment authorization result on the product to be transacted from at least one of the seller server 100, the mobile terminal 300, and the payment server 400.

The control unit 240 generally controls overall operations of the display device 200. In other words, the control unit 240 may control the output unit 210, the selection unit 220, and the communication unit 230. The control unit 240 may be embodied by a processor, microprocessor, etc.

According to an exemplary embodiment, the control unit 240 may encode the transaction information received from the seller server 100 in NDEF. The control unit 240 may store the transaction information encoded in NDEF in an NFC tag.

The control unit 240 may delete the transaction information transmitted to the mobile terminal 300 from the NFC tag.

According to an exemplary embodiment, the control unit 240 may receive a selection on at least one application from the list of the plurality of shopping applications from the user. Here, the control unit 240 may execute the selected application and request a product list from the seller server 100 corresponding to the selected application.

The exemplary embodiments may program commands executable via any computer means and recorded in a computer-readable recording medium. The computer-readable recording medium may include a program command, a data file, and a data structure solely or in combination. The program commands recorded in the computer-readable recording medium may be specifically designed and configured for an exemplary embodiment. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Examples of program commands include not only machine language codes prepared by a compiler, but also high-level language codes executable by a computer by using an interpreter.

According to an exemplary embodiment, since the mobile terminal 300 directly performs a payment process on a product displayed on the display device 200, information about a payment method of a user may be prevented from being leaked.

The product displayed on the display device 200 may be easily paid through a simple gesture of a user touching the mobile terminal 300 to the display device 200.

While the exemplary embodiments have been particularly shown and described with reference to the drawings, it will be understood by those of ordinary skill in the art that various changes in form and details may be made therein without departing from the spirit and scope of the inventive concept as defined by the following claims.

What is claimed is:

1. A method of acquiring and processing information on a mobile terminal, the method comprising:
   in response to a user tapping the mobile terminal to a television, transmitting a signal from the mobile terminal over a short range communication link to the television displaying at least one item among a plurality of items based on a television broadcast signal, wherein the signal comprises a selection of the at least one item among the plurality of items and a request for transaction information related to the selected at least one item, wherein the transaction information is provided to the television by a seller server identified based on the television broadcast signal;
   receiving, at the mobile terminal and from the television via the short range communication link, the transaction information encoded in NFC data exchange format (NDEF);
   displaying, at the mobile terminal, a list comprising the transaction information respectively corresponding to the at least one item being displayed; and
   performing, by the mobile terminal, a function for the at least one item based on the received transaction information, wherein the function comprises performing a payment process with a payment server based on the received transaction information,
   wherein the performing the function comprises transmitting the transaction information and information about a payment method of the selected at least one item from the mobile terminal to the payment server,
   wherein the television broadcast signal comprises at least one of broadcasting channel information and broadcasting time information, and
   wherein the signal comprises at least one of a voice call signal, an image call signal, and a data signal.

2. The method of claim 1, wherein the receiving the transaction information is performed by using wireless communication.

3. The method of claim 2, wherein the wireless communication comprises near field communication (NFC).

4. The method of claim 1, further comprising:
   selecting, at the mobile terminal, the transaction information,
   wherein the function is performed based on the selecting the transaction information.

5. The method of claim 1, wherein the performing the function comprises transmitting a request for additional information based on the received transaction information and information about a selection of the user.

6. The method of claim 5, further comprising receiving additional information corresponding to the request for additional information.

7. The method of claim 1, wherein the receiving the transaction information comprises:
   receiving the information encoded in the NDEF; and
   decoding the information encoded in the NDEF.

8. The method of claim 7, wherein the information encoded in the NDEF comprises a first field comprising information about the television and a second field comprising the information about the at least one item displayed on the television.

9. The method of claim 1, wherein the receiving the transaction information further comprises receiving at least one of location information and identifier (ID) information of the television.

10. The method of claim 1, wherein the television is included in at least one of a kiosk, a vending machine, and an advertisement device.

11. An information providing method for providing information from a television to a mobile terminal, the information providing method comprising:
   displaying a screen comprising a plurality of items on the television;
   in response to a user tapping the mobile terminal to the television, receiving, by the television, a signal from the mobile terminal, the signal comprising a selection of at least one item among the plurality of items and a request for transaction information related to the at least one item;

identifying, by the television, a server based on a television broadcast signal related to the at least one item;

receiving, by the television, first information about the at least one item from the server; and transmitting, by the television, second information corresponding to the first information to the mobile terminal through wireless communication, the second information being encoded in NFC data exchange format (NDEF); and causing the mobile terminal to display at least one menu item corresponding to the at least one item displayed on the screen based on the second information, wherein the second information comprises the transaction information used by the mobile terminal to perform a payment process with a payment server, and wherein the television broadcast signal comprises at least one of broadcasting channel information and broadcasting time information.

12. The information providing method of claim 11, wherein the wireless communication comprises near field communication (NFC).

13. The information providing method of claim 11, wherein the transmitting the second information comprises:

encoding the first information to generate the second information encoded in the NDEF; and transmitting the second information encoded in the NDEF to the mobile terminal.

14. The information providing method of claim 13, wherein the transmitting the second information encoded in the NDEF comprises storing the second information encoded in the NDEF in an NFC tag.

15. The information providing method of claim 14, further comprising deleting the second information transmitted to the mobile terminal from the NFC tag.

16. The information providing method of claim 15, wherein the second information comprises a first field comprising information about the television and a second field comprising information about the at least one item displayed on the television.

17. The information providing method of claim 11, wherein the at least one item is an on-air item displayed on the television as part of a broadcast.

18. The information providing method of claim 11, wherein the television is included in at least one of a kiosk, a vending machine, and an advertisement device.

* * * * *